US009505450B1

(12) United States Patent
Girouard et al.

(10) Patent No.: US 9,505,450 B1
(45) Date of Patent: Nov. 29, 2016

(54) SNOWMOBILE POWERTRAIN

(71) Applicant: BOMBARDIER RECREATIONAL PRODUCTS INC., Valcourt (CA)

(72) Inventors: Bruno Girouard, Shefford (CA); Jean-Sebastien Pard, Tingwick (CA); Jean-Francois Lambert, Orford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/733,730

(22) Filed: Jun. 8, 2015

Related U.S. Application Data

(63) Continuation-in-part of application No. 14/629,691, filed on Feb. 24, 2015, now abandoned.

(60) Provisional application No. 61/943,954, filed on Feb. 24, 2014.

(51) Int. Cl.
| | |
|---|---|
| *B62D 37/04* | (2006.01) |
| *B62M 27/02* | (2006.01) |
| *B60K 17/08* | (2006.01) |
| *B62D 55/125* | (2006.01) |

(52) U.S. Cl.
CPC .............. *B62D 37/04* (2013.01); *B60K 17/08* (2013.01); *B62D 55/125* (2013.01); *B62M 27/02* (2013.01); *B62M 2027/023* (2013.01)

(58) Field of Classification Search
CPC ...... B62D 37/04; B60K 17/08; B62M 27/02; B62M 2027/023
USPC ......................................... 180/190
See application file for complete search history.

(56) References Cited

U.S. PATENT DOCUMENTS

| | | | |
|---|---|---|---|
| 2,960,058 A | 11/1960 | Magnani | |
| 3,734,222 A | 5/1973 | Bardwick | |
| 5,314,034 A | 5/1994 | Chittal | |
| 5,685,387 A * | 11/1997 | Rioux | B62M 27/02 180/190 |
| 6,155,374 A * | 12/2000 | Uchida | F02D 13/0249 180/309 |
| 6,360,838 B1 | 3/2002 | Kulhavy | |
| 6,561,297 B2 * | 5/2003 | Yatagai | B62M 27/02 123/196 R |
| 6,626,258 B1 | 9/2003 | Forbes | |
| 6,715,460 B2 * | 4/2004 | Ashida | B62M 27/02 123/196 A |
| 6,725,958 B2 * | 4/2004 | Ashida | F02B 67/06 123/195 R |
| 6,848,529 B2 * | 2/2005 | Moriyama | B62M 27/02 123/196 R |
| 6,889,787 B2 | 5/2005 | Karpik | |

(Continued)

OTHER PUBLICATIONS

Redline Performance Products Inc.; Revolt 800 Catalog; 2003, California, United States of America.

*Primary Examiner* — Kevin Hurley
*Assistant Examiner* — Michael Stabley
(74) *Attorney, Agent, or Firm* — BCF LLP

(57) ABSTRACT

A snowmobile has a frame having a tunnel, a motor mounted to the frame, the motor having a motor shaft, at least one ski operatively connected to the frame and a continuously variable transmission. The continuously variable transmission has a driving pulley operatively connected to the motor shaft, a driven pulley, and a drive belt looped around the driving pulley and the driven pulley. The snowmobile also has a drive track operatively connected to the driven pulley, a flexible mechanical element operatively connecting the drive track to the driven pulley, the drive track rotating in a first direction during operation of the snowmobile, and at least one of the motor shaft. The driving pulley and the driven pulley rotate in a second direction opposite the first direction during operation of the snowmobile.

35 Claims, 20 Drawing Sheets

(56) References Cited

U.S. PATENT DOCUMENTS

| | | | |
|---|---|---|---|
| 6,923,287 B2 * | 8/2005 | Morii | B62M 27/02 |
| | | | 180/182 |
| 7,007,657 B2 * | 3/2006 | Morii | B62M 27/02 |
| | | | 123/197.1 |
| 7,104,355 B2 * | 9/2006 | Hoi | B60K 25/02 |
| | | | 180/190 |
| 7,648,148 B1 | 1/2010 | Mercier | |
| 8,798,882 B2 * | 8/2014 | Monfette | B60W 10/107 |
| | | | 474/28 |
| 9,051,027 B1 | 6/2015 | Vezina et al. | |
| 2002/0129982 A1 | 9/2002 | Harle et al. | |
| 2007/0176384 A1 | 8/2007 | Brudeli | |
| 2010/0140007 A1 | 6/2010 | Ogura et al. | |
| 2012/0178561 A1 * | 7/2012 | Lafreniere | F16H 55/56 |
| | | | 474/28 |
| 2012/0178562 A1 * | 7/2012 | Monfette | F16H 9/18 |
| | | | 474/28 |
| 2012/0179344 A1 * | 7/2012 | Rioux | F16H 61/66272 |
| | | | 701/61 |
| 2012/0298437 A1 | 11/2012 | Dietz | |
| 2013/0080007 A1 * | 3/2013 | Monfette | B60W 10/107 |
| | | | 701/61 |

\* cited by examiner

SNOWMOBILE POWERTRAIN

CROSS-REFERENCE

The present application is a continuation-in-part of U.S. patent application Ser. No. 14/629,691, filed Feb. 24, 2015, which claims priority to U.S. Provisional Patent Application No. 61/943,954, filed Feb. 24, 2014, the entirety of both of which is incorporated herein by reference.

FIELD OF TECHNOLOGY

The present technology relates to snowmobile powertrains.

BACKGROUND

FIG. 1 schematically illustrates an exemplary prior art powertrain 10 for a snowmobile. The powertrain 10 includes an engine 12, a continuously variable transmission (CVT) 14 and a fixed ratio reduction drive 16. A throttle body 18 having a throttle valve 20 therein is connected to air intake ports of the engine 12 to control the flow of air to the engine 12. The CVT 14 includes a driving pulley 22 and a driven pulley 24. The driving pulley 22 is coupled to a crankshaft (not shown) of the engine 12 to rotate with the crankshaft. The driven pulley 24 is coupled to one end of a transversely mounted jackshaft 26 which is supported on a frame (not shown) of the snowmobile through bearings. The transversely mounted jackshaft 26 traverses the width of the engine 12. The opposite end of the transversely mounted jackshaft 26 is connected to the input member of the reduction drive 16 and the output member of the reduction drive 16 is connected to a drive axle 28 carrying sprocket wheels (not shown) that form a driving connection with a drive track (not shown) of the snowmobile.

The driving pulley 22 of the CVT 14 includes a pair of opposed frustoconical belt drive sheaves 30 and 32 between which a drive belt 34 is located. The driven pulley 24 includes a pair of frustoconical belt drive sheaves 36 and 38 between which the drive belt 34 is located. As can be seen, the drive belt 34 is looped around both the driving pulley 22 and the driven pulley 24. The torque being transmitted to the driven pulley 24 provides the necessary clamping force on the drive belt 34 through its torque sensitive mechanical device in order to efficiently transfer torque to the other powertrain components. The effective diameters of the driving pulley 22 and the driven pulley 24 are the result of the equilibrium of forces on the drive belt 34 from a centrifugal actuation system of the driving pulley 22 and the torque sensitive mechanism of the driven pulley 24.

In the powertrain 10, all of the rotating parts rotate in the same direction as the drive track as illustrated by the white arrows. As such, the angular momentums of all of these components add up during operation.

Snowmobiling, especially in soft powdered snow, sometimes requires the snowmobile to be leaned to one side to facilitate turning. In order to cause the snowmobile to lean, the total angular momentum of the rotating parts of the powertrain needs to be overcome. As would be understood, the higher the angular momentum is, the harder it is to lean the snowmobile.

There is therefore a need for a snowmobile powertrain having a lower angular momentum.

SUMMARY

It is an object of the present technology to ameliorate at least some of the inconveniences present in the prior art.

In one aspect, implementations of the present technology provide a snowmobile having a frame having a tunnel, a motor mounted to the frame, the motor having a motor shaft, at least one ski operatively connected to the frame and a continuously variable transmission. The continuously variable transmission has a driving pulley operatively connected to the motor shaft, a driven pulley, and a drive belt looped around the driving pulley and the driven pulley. The snowmobile also has a drive track operatively connected to the driven pulley, a flexible mechanical element operatively connecting the drive track to the driven pulley, the drive track rotating in a first direction during operation of the snowmobile, and at least one of the motor shaft. The driving pulley and the driven pulley rotate in a second direction opposite the first direction during operation of the snowmobile.

In some implementations, the motor is an internal combustion engine and the motor shaft is a crankshaft.

In some implementations, the engine has at least one exhaust port defined on a rear side thereof.

In some implementations, the motor shaft, the driving pulley and the driven pulley rotate in the second direction during operation of the snowmobile.

In some implementations, the flexible mechanical element is one of a belt, and a chain.

In some implementations, the driven pulley is connected to a jackshaft to drive the jackshaft. The jackshaft is operatively connected to the flexible mechanical element to drive the flexible mechanical element. The jackshaft rotates in the second direction during operation of the snowmobile.

In some implementations, a drive axle operatively connects the drive track to the flexible mechanical element. The drive axle rotates in the first direction during operation of the snowmobile. A first sprocket wheel is operatively connected to the jackshaft. A second sprocket wheel is connected to the drive axle. The flexible mechanical element is a timing belt engaging the first and second sprocket wheels. The first and second sprocket wheels rotate in the first direction during operation of the snowmobile.

In some implementations, the continuously variable transmission is disposed on one side of the motor. The first and second sprocket wheels and the timing belt are disposed on another side of the motor.

In some implementations, a first gear is connected to the jackshaft, and a second gear is connected to the first sprocket wheel. The first gear drives the second gear. The second gear drives the first sprocket wheel. The first gear rotates in the second direction and the second gear rotates in the first direction during operation of the snowmobile.

In some implementations, the drive belt is disposed laterally between the motor and a side wall of the tunnel.

In some implementations, the driven pulley extends at least in part over the tunnel.

In another aspect, implementations of the present technology provide a snowmobile having a frame having a tunnel, a motor mounted to the frame, the motor having a motor shaft, at least one ski operatively connected to the frame, a drive track operatively connected to the motor shaft, the drive track rotating in a first direction during operation of the snowmobile, and a rotor supported by the frame. The rotor rotates about a laterally extending axis in a second direction opposite the first direction during operation of the snowmobile. The laterally extending axis is perpendicular to a longitudinal centerline of the snowmobile.

In some implementations, a continuously variable transmission operatively connects the motor to the drive track. The continuously variable transmission has a driving pulley operatively connected to the motor shaft, a driven pulley operatively connected to the drive track, and a drive belt looped around the driving pulley and the driven pulley.

In some implementations, a drive axle operatively connects the drive track to the driven pulley. The laterally extending axis is disposed forward of an axis of rotation of the drive axle and rearward of an axis of rotation of the driven pulley.

In some implementations, an electric motor is connected to the rotor for driving the motor about the laterally extending axis in the second direction.

In some implementations, the snowmobile also has a start actuator for starting the motor. Following actuation of the start actuator, the electric motor starts increasing a speed of rotation up to a predetermined speed of rotation, and then maintains the speed of rotation of the rotor at the predetermined speed of rotation.

In some implementations, the laterally extending axis is fixed.

In some implementations, a mass, a radius and a speed of rotation of the rotor are selected such that: for snowmobile speeds below a predetermined snowmobile speed, a magnitude of a sum of angular momentums of all components of the snowmobile rotating in the first direction is less than a magnitude of a sum of angular momentums of all components of the snowmobile rotating in the second direction; and for snowmobile speeds above the predetermined snowmobile speed, the magnitude of the sum of angular momentums of all components of the snowmobile rotating in the first direction is greater than the magnitude of the sum of angular momentums of all components of the snowmobile rotating in the second direction.

In some implementations, the motor is an internal combustion engine having at least one exhaust port. The rotor is driven about the laterally extending axis by exhaust gases.

In some implementations, a muffler fluidly communicates with the at least one exhaust port. The rotor is disposed inside the muffler and exhaust gases entering the muffler drive the rotor about the laterally extending axis.

In another aspect, implementations of the present technology provide a method for operating a snowmobile. The snowmobile has a frame having a tunnel, a motor mounted to the frame, the motor having a motor shaft, at least one ski operatively connected to the frame, a drive track operatively connected to the motor shaft, and a rotor supported by the frame. The rotor rotates about a laterally extending axis. The laterally extending axis is perpendicular to a longitudinal centerline of the snowmobile. The method comprises: operating the motor to turn the motor shaft in a first direction; driving, with the motor shaft, the drive track in the first direction; increasing a speed of rotation of the rotor up to a predetermined speed of rotation, the rotor turning in a second direction opposite the first direction; and maintaining the speed of rotation of the rotor at the predetermined speed of rotation in the second direction once the predetermined speed of rotation has been reached, the speed of rotation of the rotor being independent of a speed of the motor, the predetermined speed of rotation being selected such that a sum of an angular momentum generated by the rotor at the predetermined speed of rotation and an angular momentum of the drive track when the snowmobile is moving at a speed less than a maximum speed of the snowmobile is zero.

In some implementations, the speed of rotation of the rotor is maintained at the predetermined speed of rotation until a predetermined condition is reached. The predetermined condition is one of: the snowmobile stops moving; the motor stops; and the speed of the motor is an idle speed.

In some implementations, in response to the predetermined condition being reached, stopping the rotation of the rotor.

According to another aspect, implementation of the present technology provide a method for operating a snowmobile. The snowmobile has a frame having a tunnel, a motor mounted to the frame, the motor having a motor shaft, at least one ski operatively connected to the frame and a continuously variable transmission. The continuously variable transmission has a driving pulley operatively connected to the motor shaft, a driven pulley; and a drive belt looped around the driving pulley and the driven pulley. The snowmobile also has a drive track operatively connected to the driven pulley, and a rotor supported by the frame. The rotor rotates about a laterally extending axis. The laterally extending axis is perpendicular to a longitudinal centerline of the snowmobile. The method comprises operating the motor to turn the motor shaft in a first direction; driving, with the motor shaft, the driving pulley, the driven pulley and the drive track in the first direction; and turning the rotor in a second direction opposite the first direction at a predetermined speed of rotation. The predetermined speed of rotation is selected such that: for motor speeds below a predetermined motor speed, a magnitude of a sum of angular momentums of all components of the snowmobile rotating in the first direction being less than a magnitude of a sum of angular momentums of all components of the snowmobile rotating in the second direction; and for at least some motor speeds above the predetermined motor speed, the magnitude of the sum of angular momentums of all components of the snowmobile rotating in the first direction being greater than the magnitude of the sum of angular momentums of all components of the snowmobile rotating in the second direction.

In some implementations, the predetermined motor speed is a driving pulley engagement speed.

In some implementations, the predetermined speed of rotation of the rotor is one of a first predetermined speed of rotation and a second predetermined speed of rotation. The method further comprises selecting the one of the first and second predetermined speeds of rotation.

In some implementations, the predetermined speed of rotation of the rotor is greater than the predetermined motor speed and a speed of rotation of the track when the motor is operating at the predetermined motor speed.

In some implementations, when the magnitude of the sum of angular momentums of all components of the snowmobile rotating in the first direction is greater than the magnitude of the sum of angular momentums of all components of the snowmobile rotating in the second direction: a driven pulley speed is greater than a driving pulley speed and than a speed of rotation of the track; and a speed of rotation of the rotor is greater than the driven pulley speed.

For purposes of the present application, the term "flexible mechanical element" refers to a mechanical element such as a belt, a rope, a chain or other elastic or flexible mechanical element used to transmit torque over a distance.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
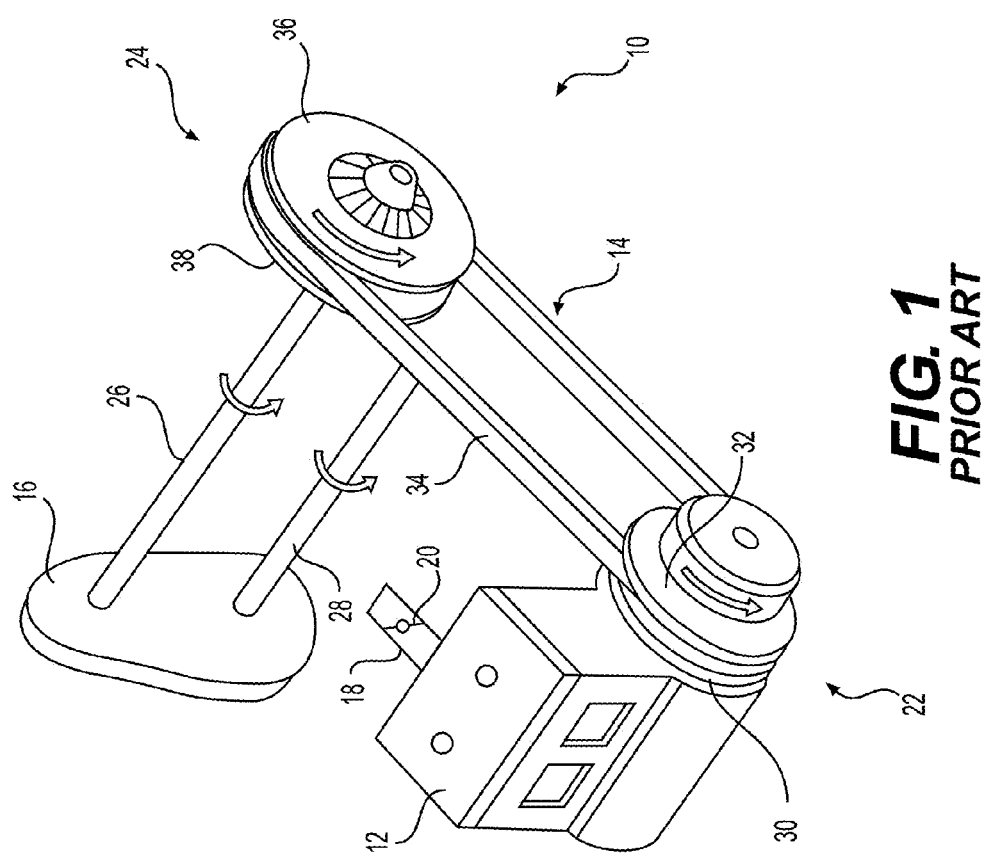
FIG. 1 is a perspective view taken from a front, left side of a prior art snowmobile powertrain.
Figure 2:
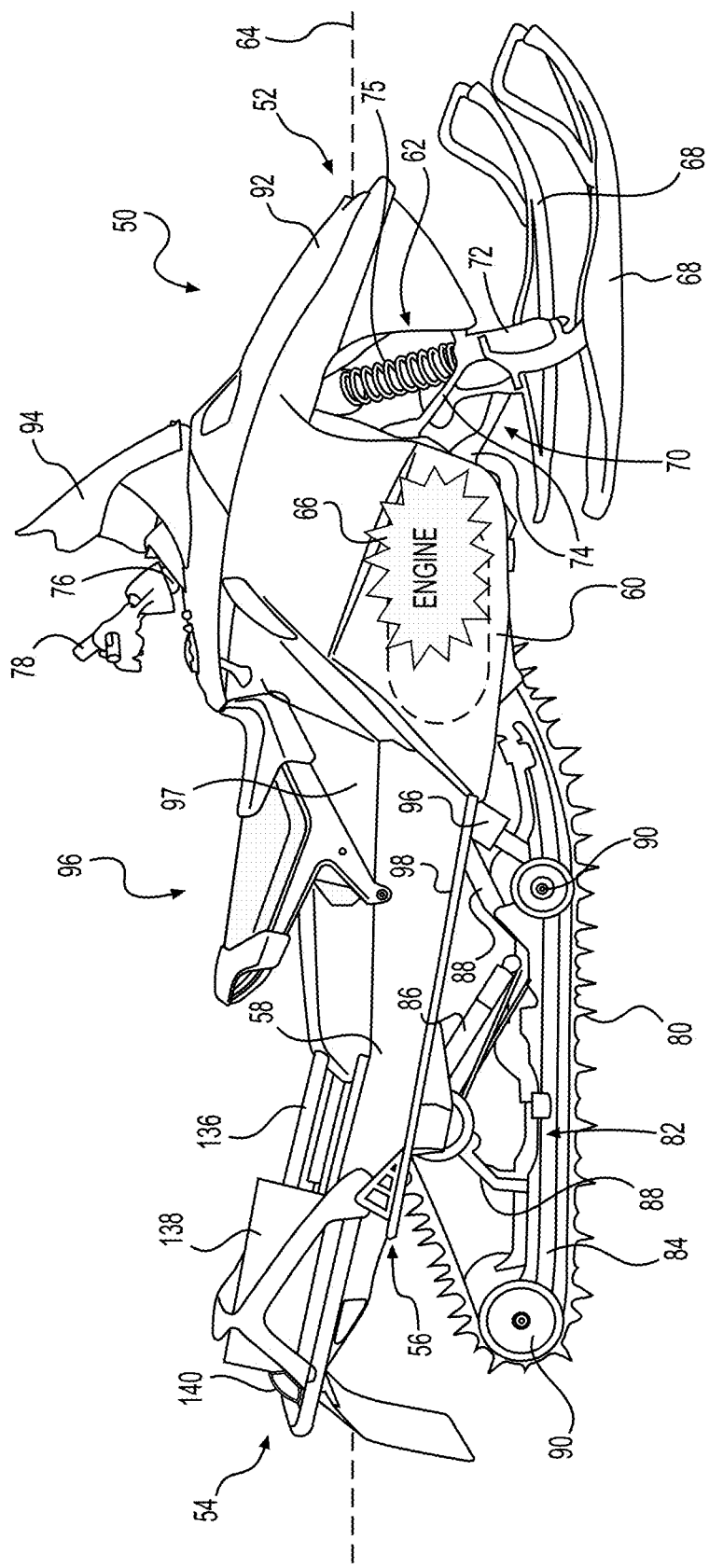
FIG. 2 is a right side perspective view of a snowmobile.

A snowmobile 50, shown in FIG. 2, includes a forward end 52 and a rearward end 54 which are defined consistently with a forward travel direction of the snowmobile 50. The snowmobile 50 includes a frame 56 which normally includes a tunnel 58, a motor cradle portion 60 and a front suspension assembly portion 62. The tunnel 58 generally consists of sheet metal parts assembled to form an inverted generally U-shape. The tunnel 58 extends rearward along a longitudinal centerline 64 of the snowmobile 50 and is connected at the front to the motor cradle portion 60. A motor, which in the present implementation is an internal combustion engine 66 (schematically illustrated in FIG. 1), is carried by the motor cradle portion 60 of the frame 56. The engine 66 is a two-stroke, two-cylinder engine. It is contemplated that the engine 66 could be a four-stroke engine and/or that it could have only one or more than two cylinders. It is contemplated that the motor could be an electric motor or an electric/internal combustion hybrid engine. A steering assembly is provided, in which two skis 68 are positioned at the forward end 52 of the snowmobile 10 and are attached to the front suspension assembly portion 62 of the frame 56 through front suspension assemblies 70. Each front suspension assembly 70 includes a ski leg 72, supporting arms 74, a shock absorber 75 and ball joints (not shown). Steering rods (not shown) connect the ski legs 72 to a steering column 76. A steering device in the form of a handlebar 78 is attached to the upper end of the steering column 76. Turning the handlebar 78, turns the steering column 76 which turns the ski legs 72 via the steering rods and thus the skis 68 in order to steer the snowmobile 50. It is contemplated that the snowmobile 50 could have only one ski 68.

An endless drive track 80 is disposed generally under the tunnel 58, and is operatively connected to the engine 66 as will be described in greater detail below. The endless drive track 80 is driven to run about a rear suspension assembly 82 for propulsion of the snowmobile 10. The rear suspension assembly 82 includes a pair of slide rails 84 in sliding contact with the endless drive track 80. The rear suspension assembly 82 also includes a plurality of shock absorbers 86 which may further include coil springs (not shown) surrounding the shock absorbers 86. Suspension arms 88 are provided to attach the slide rails 84 to the frame 56. Multiple idler wheels 90 are also provided in the rear suspension assembly 82.

At the forward end 52 of the snowmobile 10, fairings 92 enclose the engine 66 and some of its associated components, thereby providing an external shell that protects the engine 66 and these associated components. The fairings 92 include a hood and side panels which can be opened to allow access to the engine 66 and its associated components when this is required. A windshield 94 is connected to the fairings 92 near the forward end 52 of the snowmobile 50. Alternatively, the windshield 94 could be connected directly to the handlebar 78. The windshield 94 acts as a wind screen to lessen the force of the air on the rider while the snowmobile 50 is moving.

A straddle-type seat 96 is positioned on top of a fuel tank 97, above the tunnel 58 rearward of the handlebar 78. Two footrests 98 are positioned on opposite sides of the snowmobile 50 below the seat 96 to accommodate the driver's feet.

Figure 3:
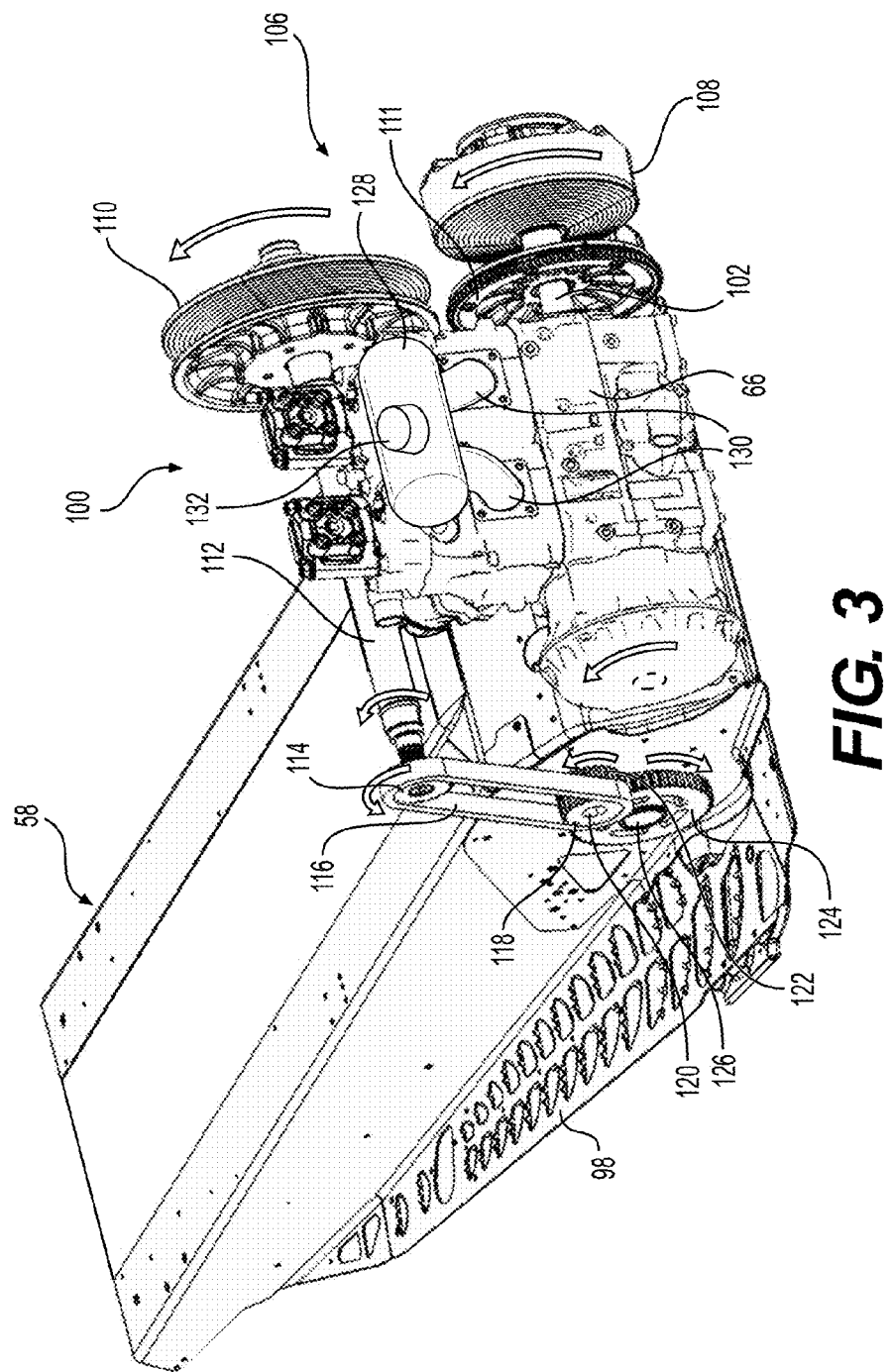
FIG. 3 is a perspective view taken from a front, right side of a portion of a powertrain and a tunnel of the snowmobile of FIG. 2.
Figure 4:
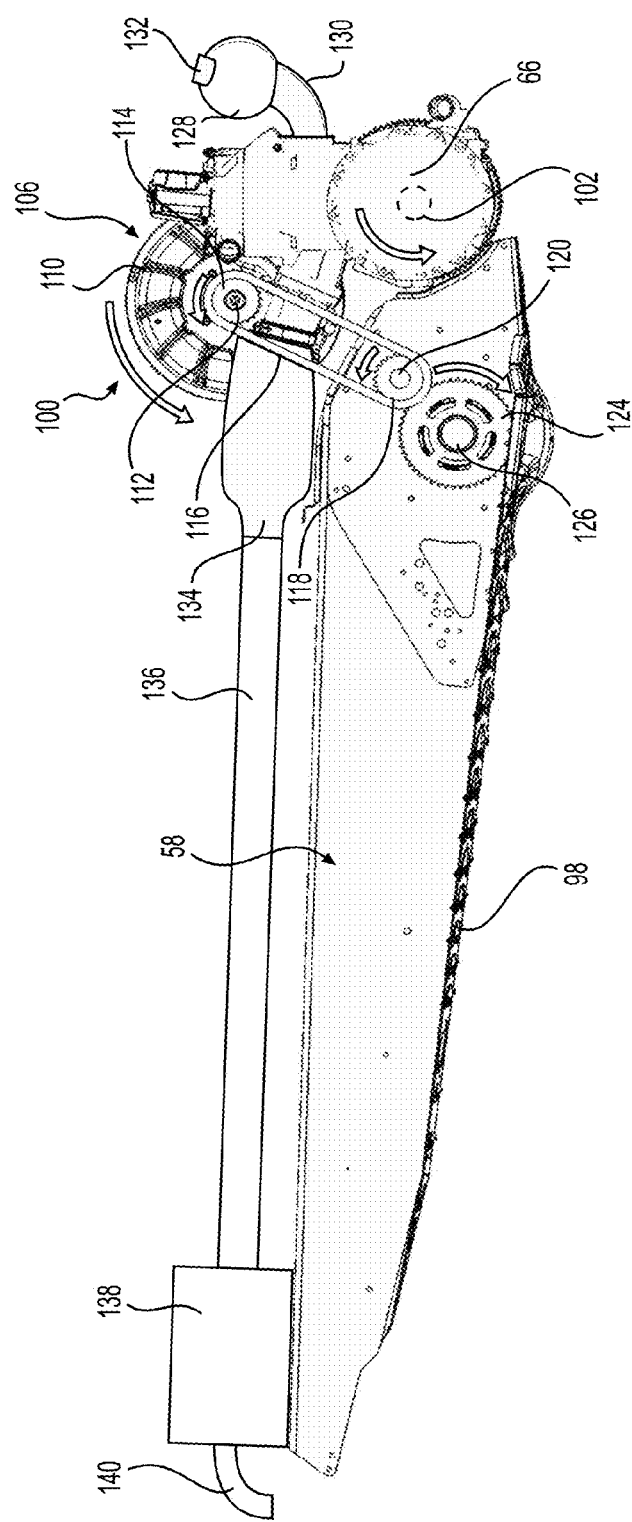
FIG. 4 is a right side elevation view of the elements of FIG. 3 with an exhaust system of the snowmobile of FIG. 2.

Turning now to FIGS. 3 and 4, a powertrain 100 of the snowmobile 50 will be described.

The engine 66 drives a crankshaft 102 (shown in dotted lines) that rotates about a horizontally disposed axis that extends generally transversely to the longitudinal centerline 64 of the snowmobile 50. The crankshaft 102 extends through a left side of the engine casing. In an implementation where the motor is an electric motor, the electric motor has a rotor that drives a shaft. As such, the shaft driven directly by the motor (i.e. the crankshaft or shaft driven by the rotor for example) is referred to herein as a motor shaft.

In an alternative implementation, a separate output shaft is connected to a left end of the crankshaft 102 and is coaxial with the crankshaft 102. It is also contemplated that the output shaft could be offset from the crankshaft 102 and be driven by the crankshaft 102 via one or more gears.

The crankshaft 102 drives a continuously variable transmission (CVT) 106 disposed on the left side of the engine 66. The CVT 106 includes a driving pulley 108, a driven pulley 110 and a drive belt (not shown) looped around both the driving pulley 108 and the driven pulley 110. The driving pulley 108 and the driven pulley 110 each includes a pair of opposed frustoconical belt drive sheaves between which the drive belt is located. The driving pulley 108 is connected to the crankshaft 102 and rotates therewith. A flywheel 111, in the form of a ring gear, is connected to the side of the driving pulley 108 facing the engine 66. The driven pulley 110 is coupled to one end of a transversely mounted jackshaft 112 which is supported on the frame 56 of the snowmobile 50 through bearings (not shown). The transversely mounted jackshaft 112 traverses the width of the engine 66.

A sprocket wheel 114 is connected to the right end of the jackshaft 112 via splines. A timing belt 116 is looped around the sprocket wheel 114 and another sprocket wheel 118. The timing belt 116 has transversely extending teeth on an inner surface thereof. The sprocket wheel 118 is disposed rearward and downward from the sprocket wheel 114. The sprocket wheel 114 drives the sprocket wheel 118 via the timing belt 116. The sprocket wheel 118 is mounted onto a shaft 120 via splines. The shaft 120 is rotationally mounted to the tunnel 58. A gear 122 is also mounted onto the shaft 120 via splines. The gear 122 is disposed between the sprocket wheel 118 and the tunnel 58. The gear 122 engages a gear 124 mounted onto a right end of a drive axle 126. The sprocket wheels 114, 118, the timing belt 116 and the gears 122, 124 are disposed inside a housing (not shown). Sprocket wheels (not shown) are mounted onto the drive axle 126 and engage the drive track 80 to drive the drive track 80.

In FIGS. 3 and 4, white arrows indicate the direction of rotation of various components of the powertrain 100 when the drive track 80 rotates in a direction causing the snowmobile 50 to move forward. In the powertrain 100, the drive axle 126, the gear 124 and the sprocket wheels mounted on the drive axle 126 rotate in the same direction as the drive track 80. The gear 122, the shaft 120, the sprocket wheels 114, 118, the timing belt 116, the jackshaft 112, the driven pulley 110, the driving pulley 108, the drive belt, the crankshaft 102 and the flywheel 111 rotate in a direction opposite to the direction of rotation of the drive track 80, thereby reducing the total angular momentum of the rotating parts.

The engine 66 has a pair of intake ports (not shown) on a front side thereof and a pair of exhaust ports (not shown) on a rear side thereof. An air box 128 disposed forwardly of the engine 66 is connected by a pair of pipes 130 to the pair of air intake ports. An inlet pipe 132 connects the air box 128 to a throttle body (not shown). As can be seen in FIG. 4, a tuned pipe 134 disposed rearwardly of the engine 66 is connected to the pair of exhaust ports. An exhaust pipe 136 connects to the rear end of the tuned pipe 134 and extends rearwardly therefrom above the tunnel 58. The rear end of the exhaust pipe 136 is connected to a muffler 138 mounted on top of the tunnel 58 on a rear portion thereof. Another exhaust pipe 140 is connected to the rear end of the muffler 138 and opens to the atmosphere. It is contemplated that in implementations where the engine 66 is replaced with a four-stroke engine, the tuned pipe 134 could be replaced by a plurality of exhaust pipes or an exhaust manifold and an exhaust pipe.

Turning now to FIGS. 5 to 13, various alternative implementations of the powertrain 100 will be described. Throughout these figures, the white arrows indicate the direction of rotation of various components of these powertrains when the drive track 80 rotates in a direction causing the snowmobile 50 to move forward. Also, elements of the powertrains illustrated in FIGS. 5 to 13 that are similar to those of the powertrain 100 described above or to those of other powertrains described below have been labeled with the same reference numerals.

Figure 5:
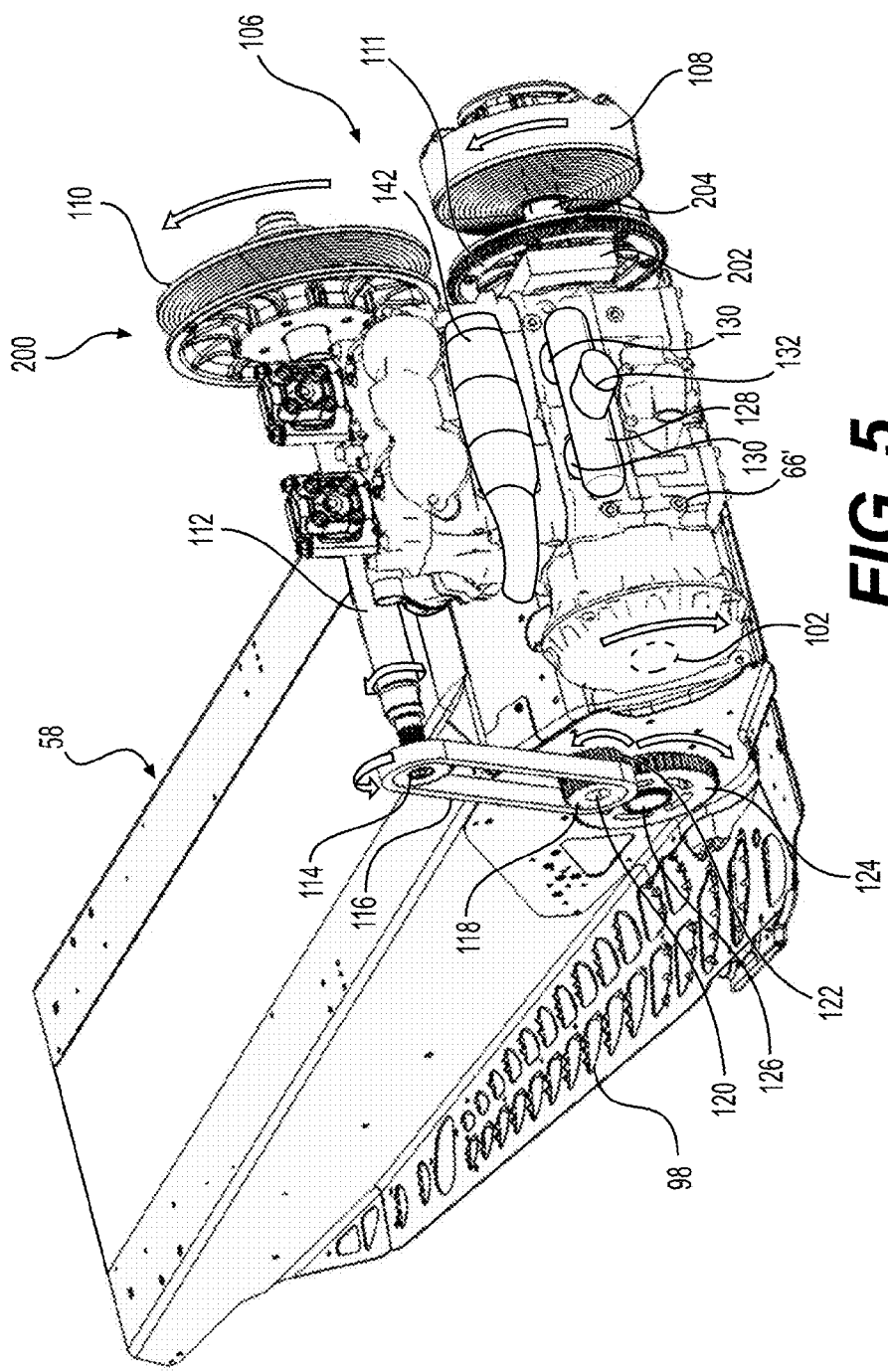
FIG. 5 is a perspective view taken from a front, right side of a portion of an alternative implementation of a powertrain and a portion of the tunnel of the snowmobile of FIG. 2.

FIG. 5 illustrates a powertrain 200. The powertrain 200 is the same as the powertrain 100 described above except for the crankshaft 102 which rotates in the same direction as the drive track 80, for the addition of a gear box 202 and for the engine 66 that has been replaced by an engine 66'. In the engine 66', both the pair of intake ports (not shown) and the pair of exhaust ports (not shown) are on a front side of the engine 66'. The air box 128 and pipes 130, 132 are connected to the air intake ports. The pair of exhaust ports is connected to an exhaust manifold 142. The exhaust manifold 142 connects exhaust ports of the engine 66' to a remainder of an exhaust system (not shown).

The gear box 202 is mounted to and is driven by the crankshaft 102. The gear box 202 has a shaft 204 onto which the driving pulley 108 is mounted. As such, the shaft 204 drives the driving pulley 108. Gears (not shown) inside the gear box 202 cause the shaft 204, and therefore the driving pulley 108, to rotate in the direction opposite to the direction of the crankshaft 102 and therefore opposite to the direction of the drive track 80.

Figure 6:
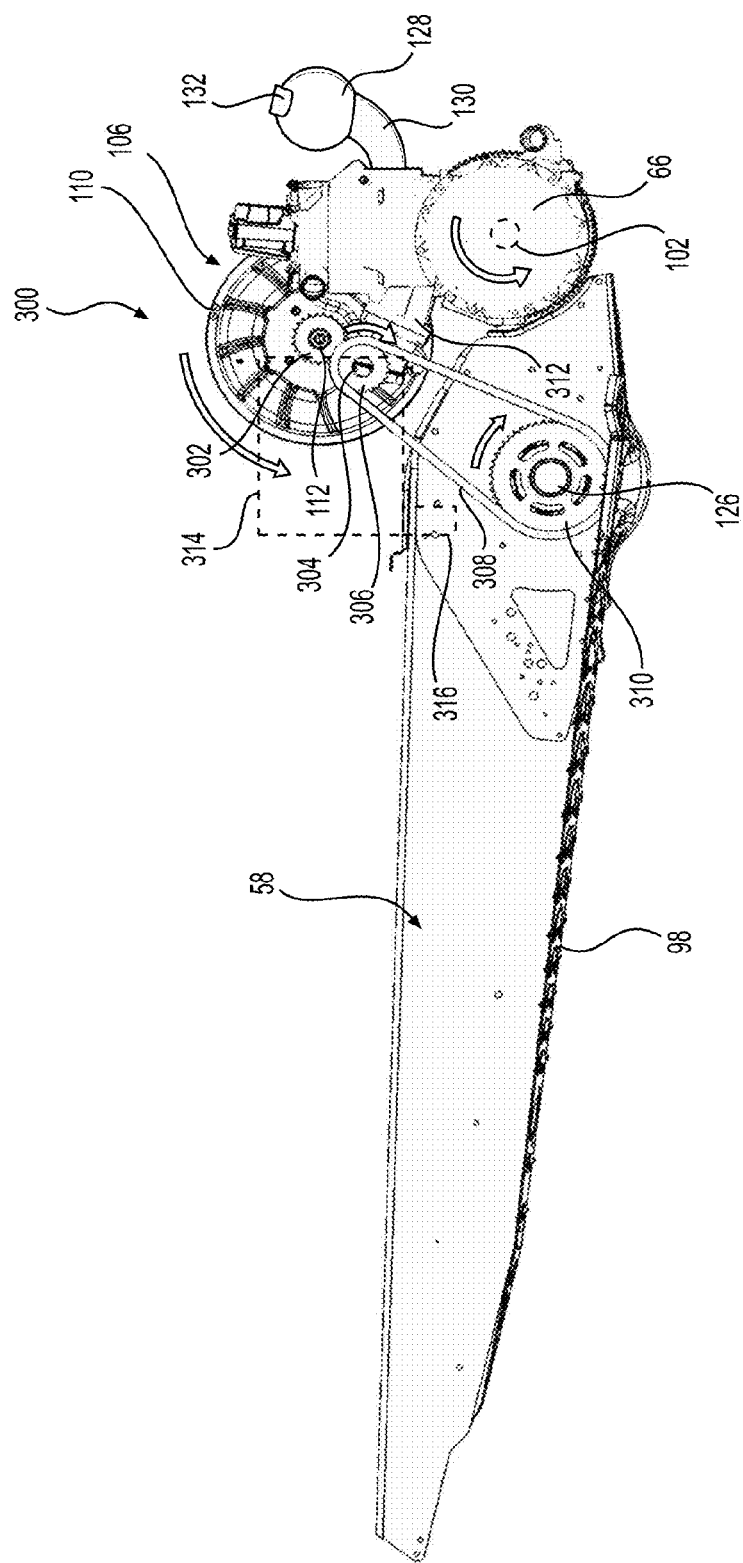
FIG. 6 is a right side elevation view of a portion of another alternative implementation of a powertrain and a portion of the tunnel of the snowmobile of FIG. 2.

FIG. 6 illustrates a powertrain 300. In the powertrain 300, the crankshaft 102 drives a jackshaft 112 as in the powertrain 100. It is contemplated that the crankshaft 102 could rotate in a direction opposite to the one illustrated and that a gear box similar to the gear box 202 described above could be provided to connect the crankshaft 102 to the driving pulley 106. A gear 302 is connected to the right end of the jack shaft 112. The gear 302 engages a gear (not shown) connected to and rotates with a shaft 304 disposed downward and rearward from the jackshaft 112. A sprocket wheel 306 is connected to and driven by the shaft 304. The sprocket wheel 306 is disposed to the right of the gear mounted onto the shaft 304. A timing belt 308 is looped around the sprocket wheel 306 and another sprocket wheel 310. The sprocket wheel 306 drives the sprocket wheel 310 via the timing belt 308. The sprocket wheel 310 is mounted onto and drives the drive axle 126. The sprocket wheels 306, 310, the timing belt 308, the gear 302 and the gear mounted onto the shaft 304 are disposed inside a housing (not shown).

In the powertrain 300, the drive axle 126, the sprocket wheels mounted on the drive axle 126, the sprocket wheels 306, 310, the timing belt 308, the shaft 304 and the gear mounted to the shaft 304 rotate in the same direction as the drive track 80. The gear 302, the jackshaft 112, the driven pulley 110, the driving pulley 108, the drive belt, the crankshaft 102 and the flywheel 111 rotate in a direction opposite to the direction of rotation of the drive track 80, thereby reducing the resulting total angular momentum of the rotating parts.

In the implementation of FIG. 6, the tuned pipe 134, the muffler 138 and the exhaust pipes 140 have been replaced by another type of exhaust system. Exhaust pipes 312 connect the exhaust ports to a muffler 314 (shown in phantom so as not to obstruct other portions of the powertrain 300). The muffler 314 is disposed between the engine 66 and the fuel tank 97. An exhaust pipe 316 (shown in dotted lines) extends from the bottom of the muffler 314, passes through the top of the tunnel 58 and opens to the atmosphere inside the tunnel 58.

Figure 7:
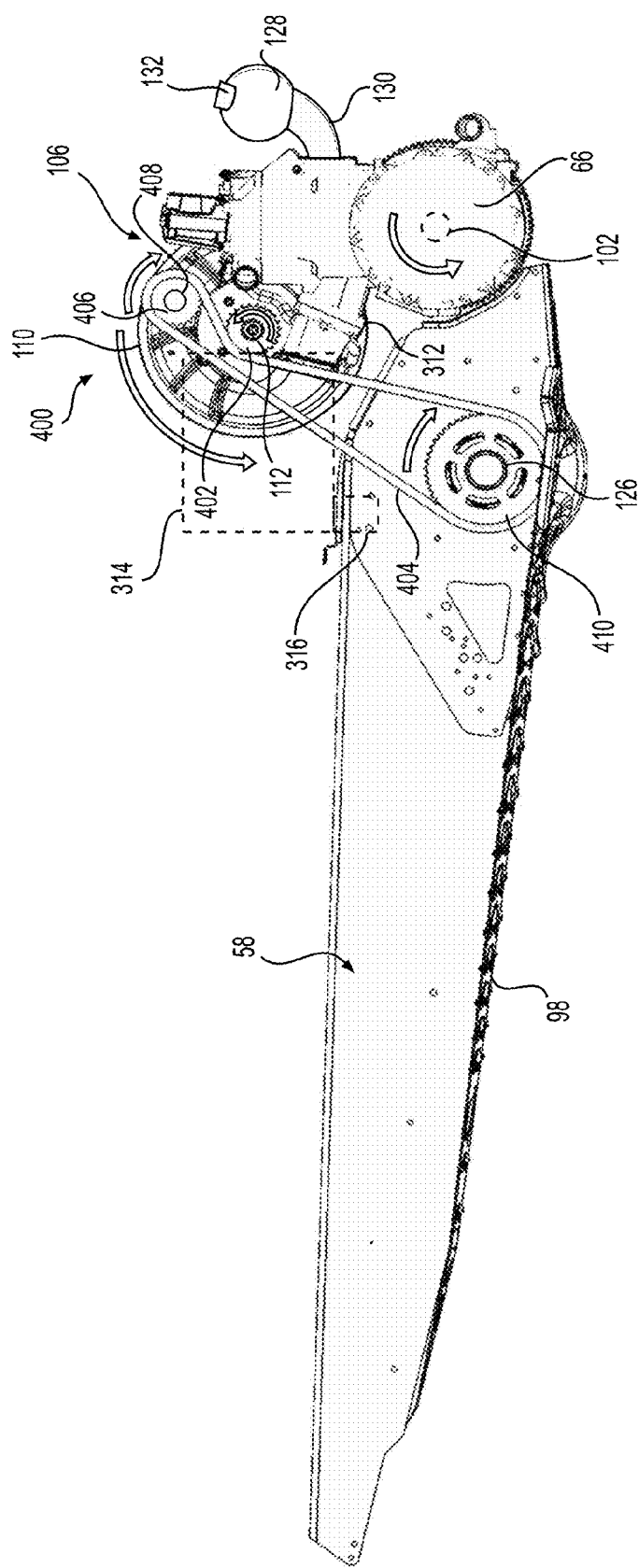
FIG. 7 is a right side elevation view of a portion of another alternative implementation of a powertrain and a portion of the tunnel of the snowmobile of FIG. 2.

FIG. 7 illustrates a powertrain 400. In the powertrain 400, the crankshaft 102 drives a jackshaft 112 as in the powertrain 100. It is contemplated that the crankshaft 102 could rotate in a direction opposite to the one illustrated and that a gear box similar to the gear box 202 described above could be provided to connect the crankshaft 102 to the driving pulley. A sprocket wheel 402 is connected to the right end of the jackshaft 112. The sprocket wheel 402 engages and drives the outer surface of a timing belt 404 having inner and outer teeth. The timing belt 404 is looped around and drives a sprocket wheel 406 mounted onto a shaft 408 and a sprocket wheel 410 mounted onto the drive axle 126. The shaft 408 is disposed forward and upward from the jackshaft 112. The sprocket wheel 410 drives the drive axle 126. The sprocket wheels 402, 406, 410 and the timing belt 404 are disposed inside a housing (not shown).

In the powertrain 400, the drive axle 126, the sprocket wheels mounted on the drive axle 126, the sprocket wheels 406, 410, the timing belt 404 and the shaft 408 rotate in the same direction as the drive track 80. The sprocket wheel 402, the jackshaft 112, the driven pulley 110, the driving pulley 108, the drive belt, the crankshaft 102 and the flywheel 111 rotate in a direction opposite to the direction of rotation of the drive track 80, thereby reducing the total angular momentum of the rotating parts.

Figure 8:
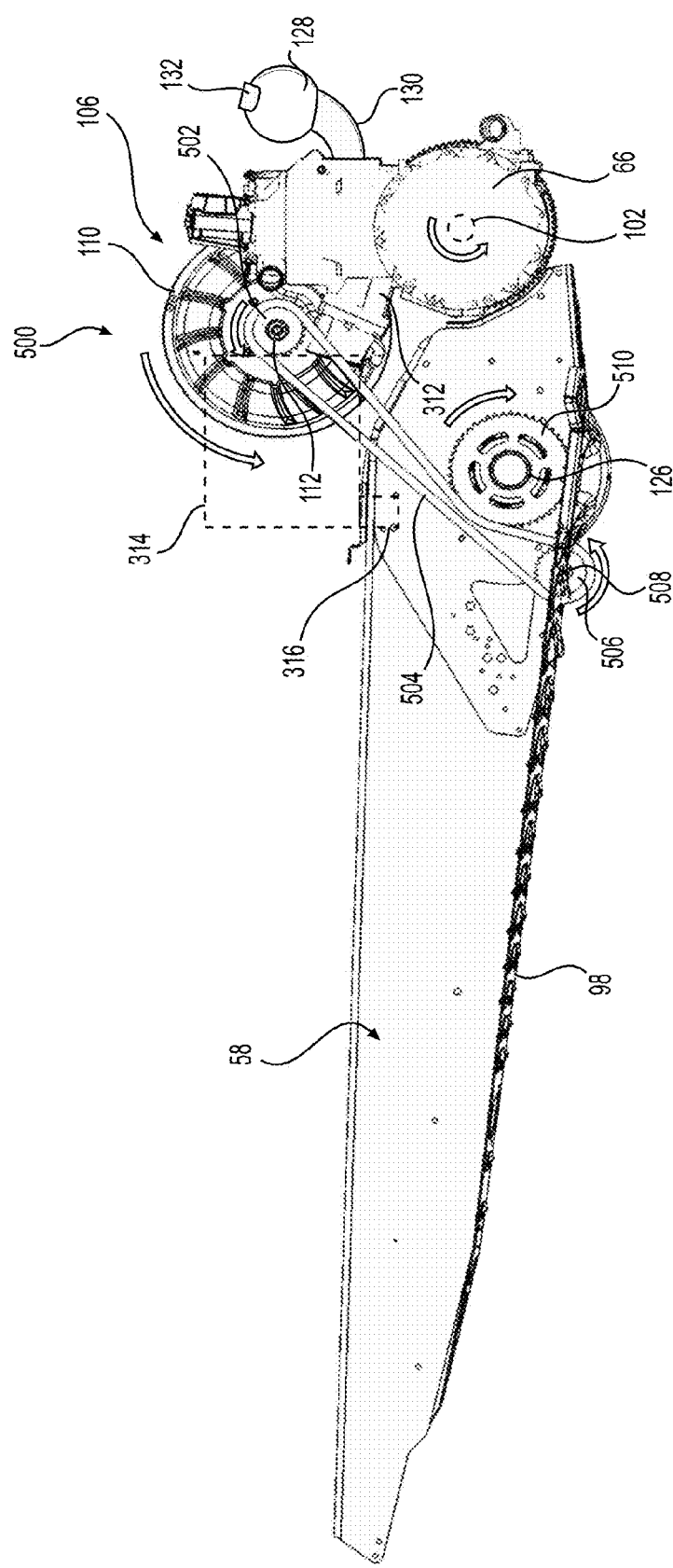
FIG. 8 is a right side elevation view of a portion of another alternative implementation of a powertrain and a portion of the tunnel of the snowmobile of FIG. 2.

FIG. 8 illustrates a powertrain 500. In the powertrain 500, the crankshaft 102 drives a jackshaft 112 as in the powertrain 100. It is contemplated that the crankshaft 102 could rotate in a direction opposite to the one illustrated and that a gear box similar to the gear box 202 described above could be provided to connect the crankshaft 102 to the driving pulley. A sprocket wheel 502 is connected to the right end of the jack shaft 112. A timing belt 504 is looped around the sprocket wheel 502 and a sprocket wheel 506. The sprocket wheel 502 drives the sprocket wheel 506 via the timing belt 504. The sprocket wheel 506 is mounted onto a shaft 508 supported by the tunnel 58. The shaft 508 is disposed downward and rearward from both the jackshaft 112 and the drive axle 126. The timing belt 504 has inner and outer teeth. The outer surface of the timing belt 504 drives a sprocket wheel 510 mounted onto and driving the drive axle 126. The sprocket wheels 502, 506, 510 and the timing belt 504 are disposed inside a housing (not shown).

In the powertrain 500, the drive axle 126, the sprocket wheels mounted on the drive axle 126 and the sprocket wheel 510 rotate in the same direction as the drive track 80. The sprocket wheels 502, 506, the shaft 508, the timing belt 504, the jackshaft 112, the driven pulley 110, the driving pulley 108, the drive belt, the crankshaft 102 and the flywheel 111 rotate in a direction opposite to the direction of rotation of the drive track 80, thereby reducing the total angular momentum of the rotating parts.

Figure 9:
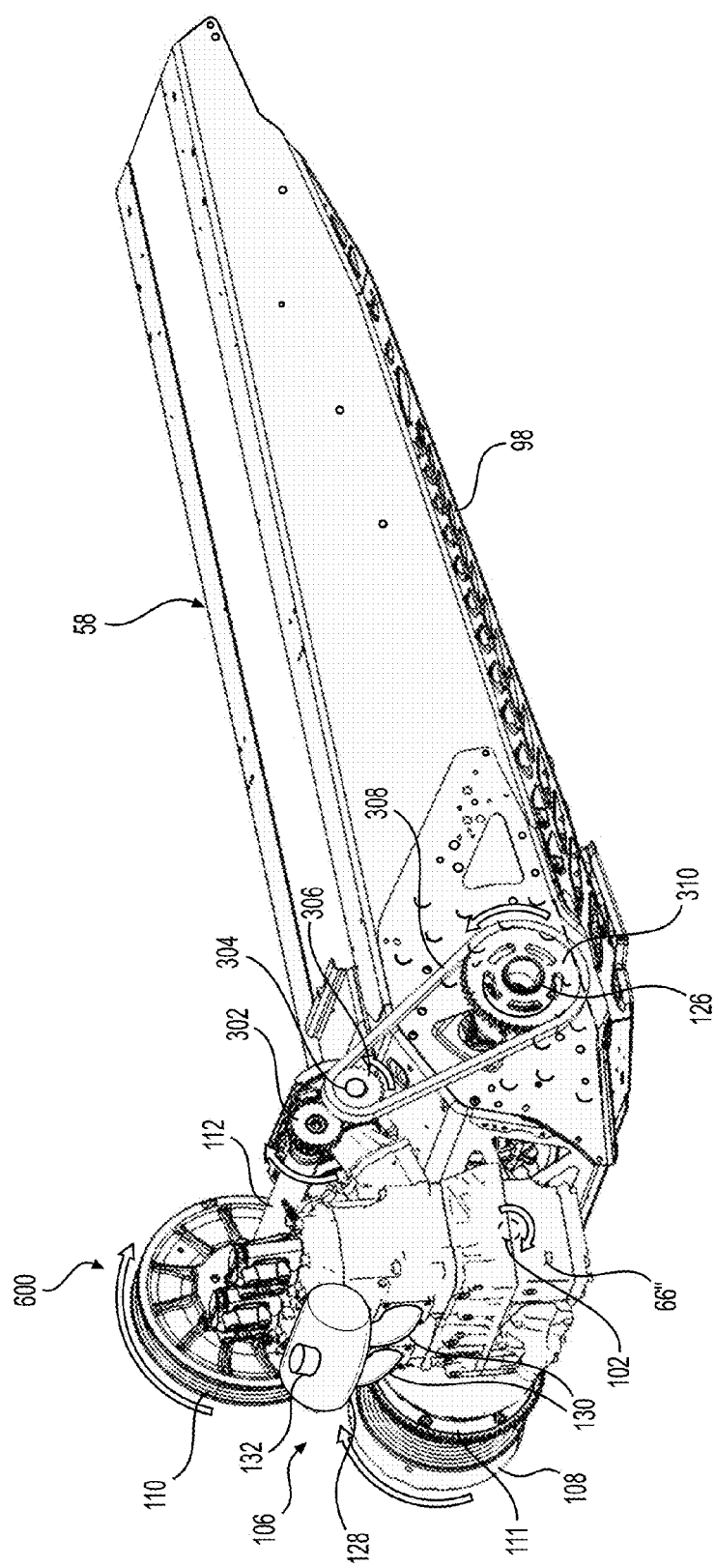
FIG. 9 is a perspective view taken from a front, left side of a portion of another alternative implementation of a powertrain and a portion of the tunnel of the snowmobile of FIG. 2.
Figure 10:
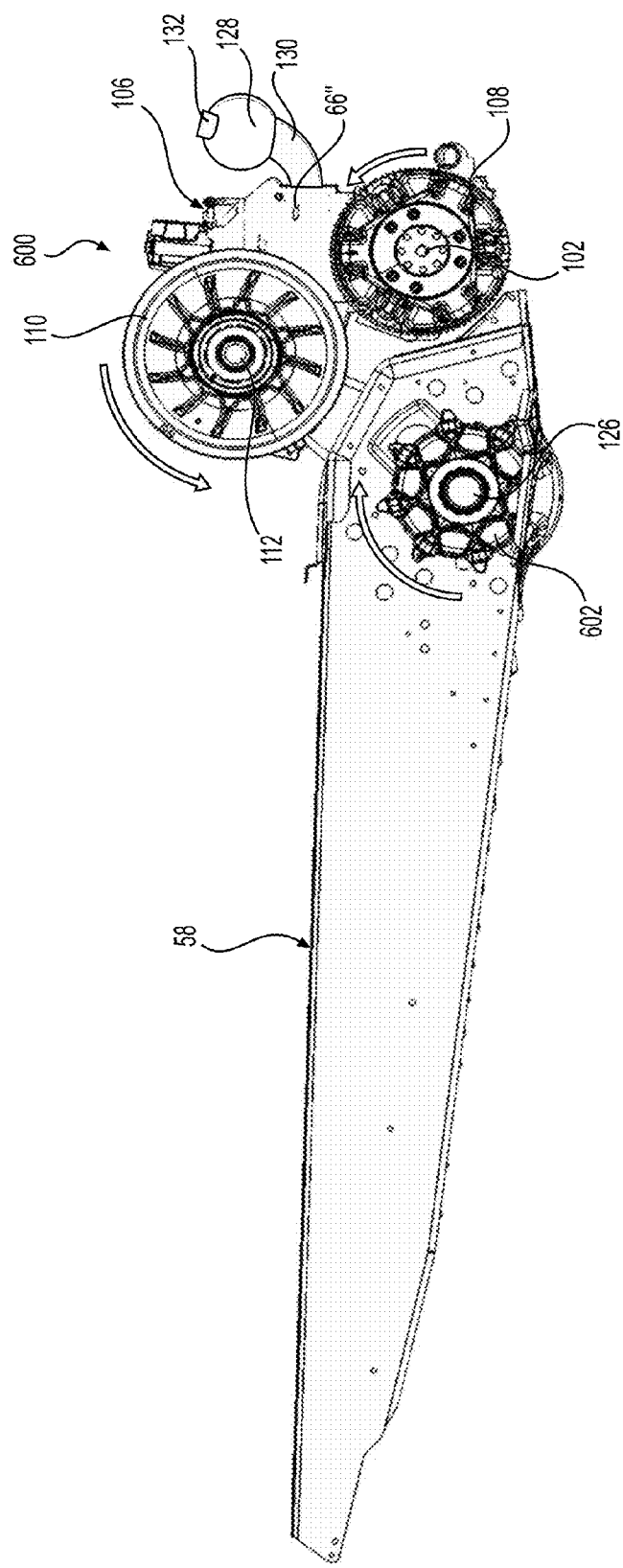
FIG. 10 is a right side elevation view of the elements of FIG. 9, with a right side of the tunnel removed to show a sprocket wheel of the powertrain.

FIGS. 9 and 10 illustrate a powertrain 600. In the powertrain 600, the engine 66 is replaced with an engine 66" in which the crankshaft 102 is connected to the crankshaft 102 extending on a right side of the engine 66". The engine 66" has a pair of intake ports (not shown) on a front side thereof and a pair of exhaust ports (not shown) on a rear side thereof. Also in the powertrain 600, the CVT 106 is disposed on a right side and the gear 302, the gear mounted onto the shaft 304, the sprocket wheels 306, 310 and the timing belt 308 are disposed on a left side. As such, the powertrain 600 is a minor image of the powertrain 300. Minor images of the powertrains 100, 200, 400 and 500 described above and the powertrains 700 and 800 described below are also contemplated. FIG. 10 shows a sprocket wheel 602 mounted onto the drive axle 126 to engage the drive track 80.

Figure 11:
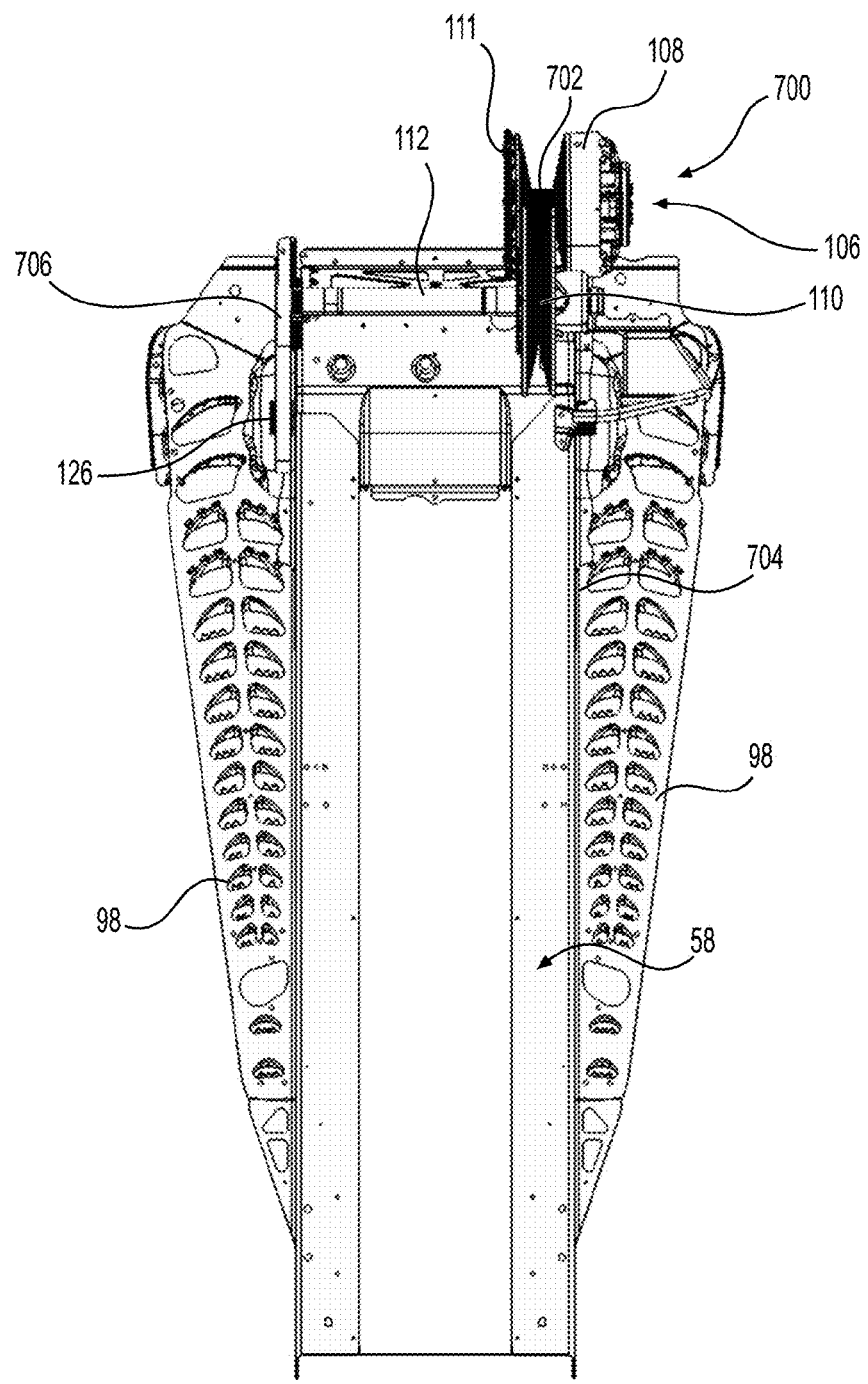
FIG. 11 is a top plan view of a portion of another alternative implementation of a powertrain and a portion of the tunnel of the snowmobile of FIG. 2 with the engine removed.

FIG. 11 illustrates a powertrain 700. The powertrain 700 has the same components as the powertrain 600 and connected to each other in the same manner, except that the CVT 106 has been moved toward the left such that the drive belt 702 is disposed to the left of the vertical right side wall 704 of the tunnel 58. As a result, the powertrain 700 provides more room above and forward of the right footrest 98. FIG. 11 also illustrates a housing 706 inside which the gear 302, the sprocket wheels 304, 310 and the timing belt 308 are disposed.

Figure 12:
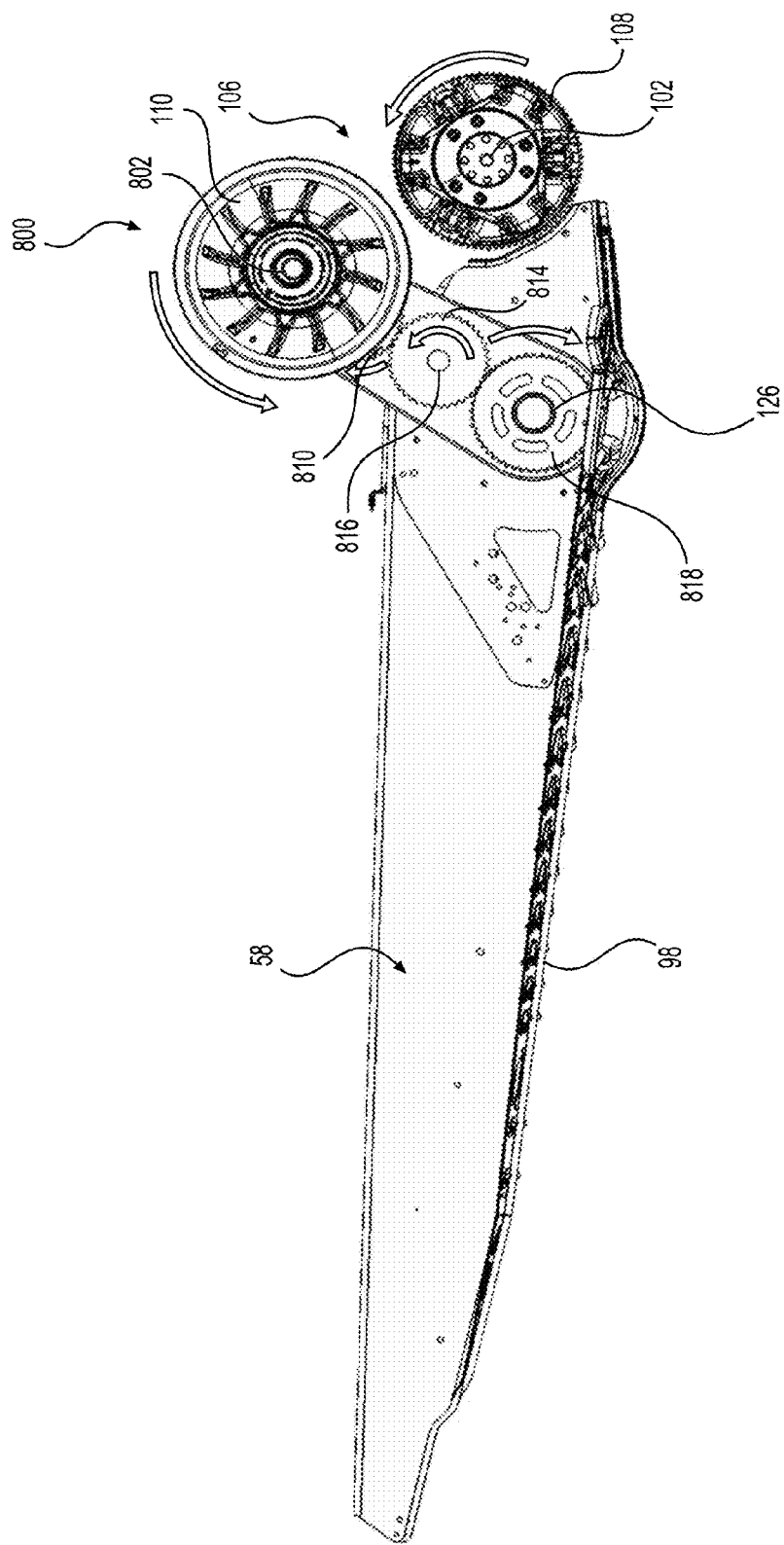
FIG. 12 is a right side elevation view of a portion of another alternative implementation of a powertrain and a portion of the tunnel of the snowmobile of FIG. 2 with the engine removed.
Figure 13:
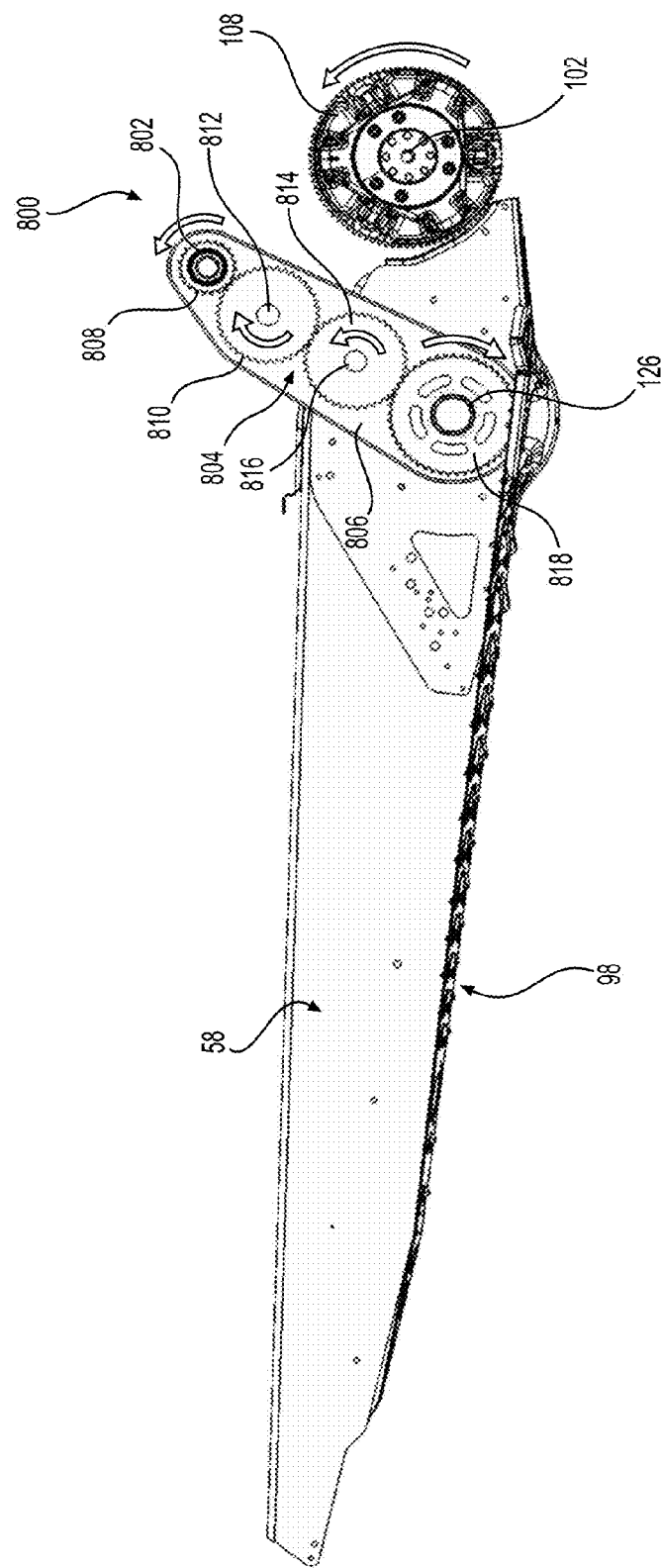
FIG. 13 is a right side elevation view of the elements of FIG. 12 with a driven pulley of a CVT removed.
Figure 14:
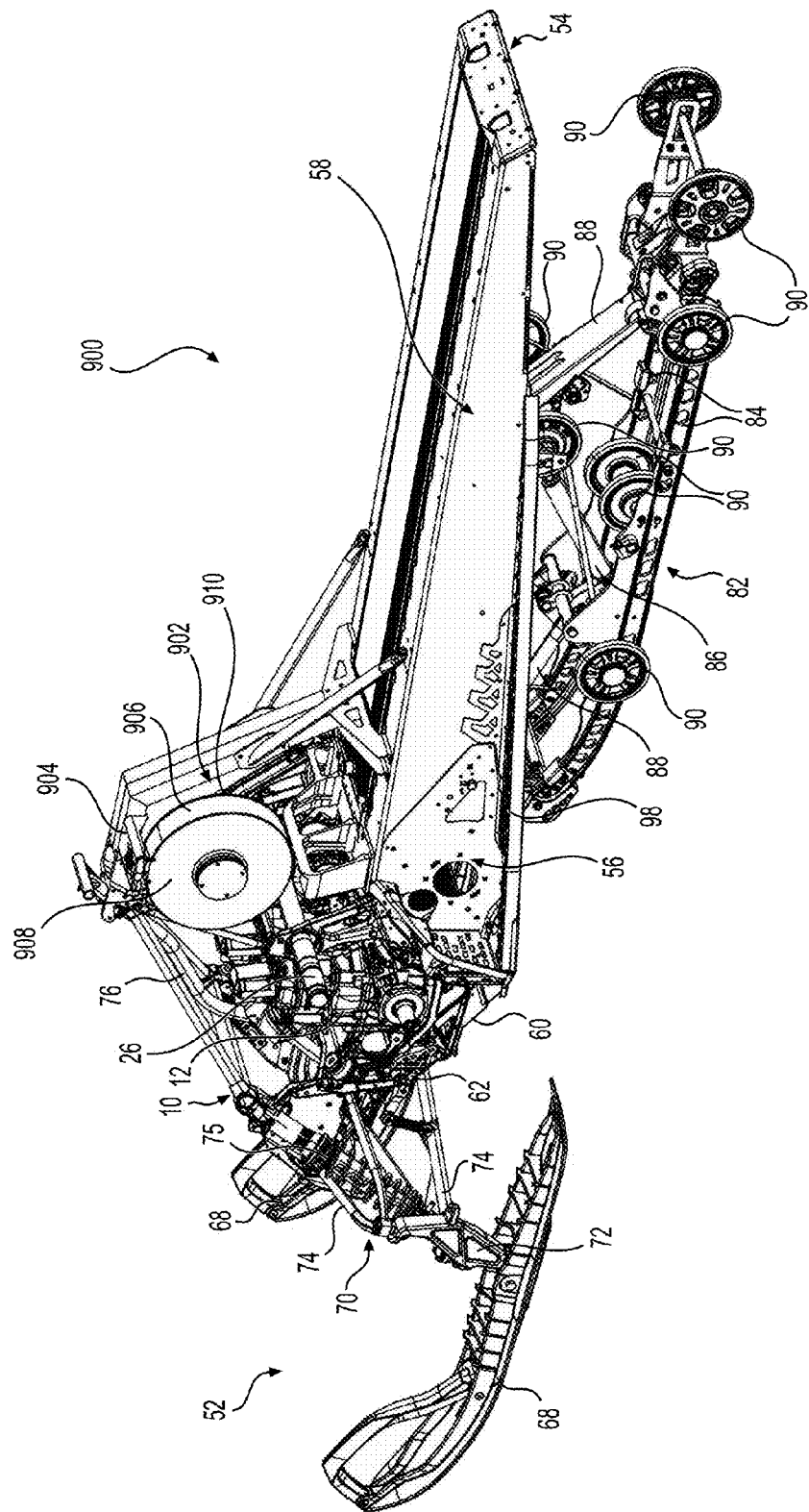
FIG. 14 is a perspective view taken from a rear, left side of an alternative implementation of the snowmobile of FIG. 2, with some elements such as the CVT, the seat, the fuel tank, the cowlings, and the track removed for clarity.

FIGS. 12 and 13 illustrate a powertrain 800. In the powertrain 800, the CVT 106 is driven by the engine 66 as in the powertrain 600. The driven pulley 110 is mounted onto and drives a shaft 802 supported by the frame 56. A gear drive 804 is driven by the shaft 802. The gear drive 804 is disposed inside a housing 806 disposed between the driven pulley 110 and the right side of the tunnel 58. The gear drive 804 includes a gear 808 mounted onto the shaft 802, a gear 810 mounted on a shaft 812, a gear 814 mounted onto a shaft 816, and a gear 818 mounted onto and driving the drive axle 126. The shaft 812 is disposed downward and rearward of the shaft 802. The shaft 816 is disposed downward and rearward of the shaft 812. The drive axle 126 is disposed downward and rearward of the shaft 816. The gear 808 drives the gear 810, which drives the gear 814, which drives the gear 818. It is contemplated that the gear drive 804 could have an arrangement of gears different from the one described above. For example, the gear drive 804 could have two gears, six gears or eight gears transferring torque from one to the other in series.

In the powertrain 800, the drive axle 126, the sprocket wheels mounted on the drive axle 126 and the gears 810, 818 rotate in the same direction as the drive track 80. The gear 808, 814, the shaft 802, the driven pulley 110, the driving pulley 108, the drive belt, the crankshaft 102 and the flywheel 111 rotate in a direction opposite to the direction of rotation of the drive track 80, thereby reducing the total angular momentum of the rotating parts.

Turning now to FIGS. 14 to 18, a snowmobile 900 will be described. The snowmobile is similar to the snowmobile 50, but is provided with the prior art powertrain 10 described above with respect to FIG. 1 and a rotor assembly 902. For simplicity, elements of the snowmobile 900 which are similar to the elements of the snowmobile 50 and the powertrain 10 have been labeled with the same reference numerals and will not be described again herein. It is contemplated that the snowmobile 900 could alternatively be provided with any one of the powertrains 100, 200, 300, 400, 500, 600, 700 and 800 described above.

Figure 15:
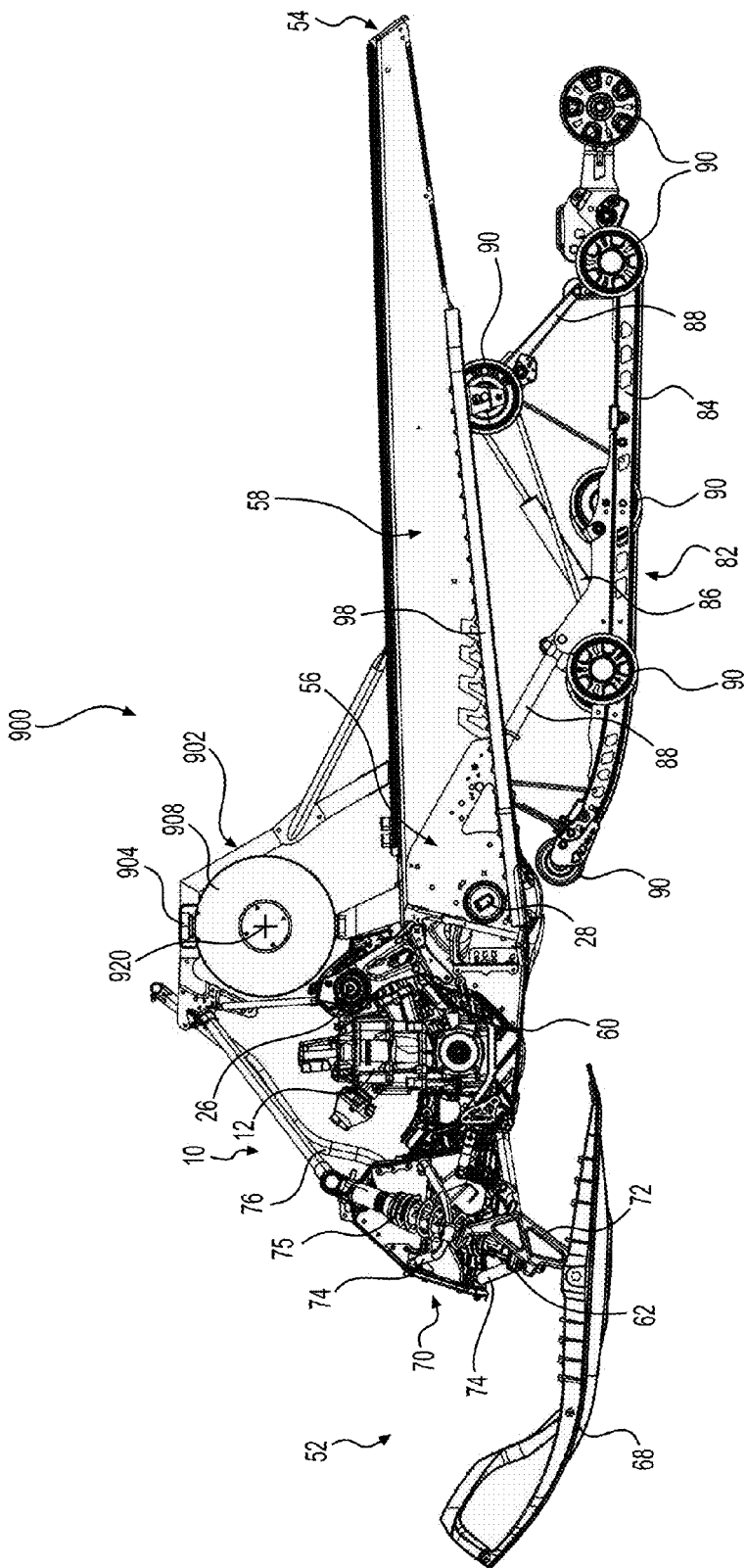
FIG. 15 is a left side elevation view of the elements of FIG. 14.
Figure 16:
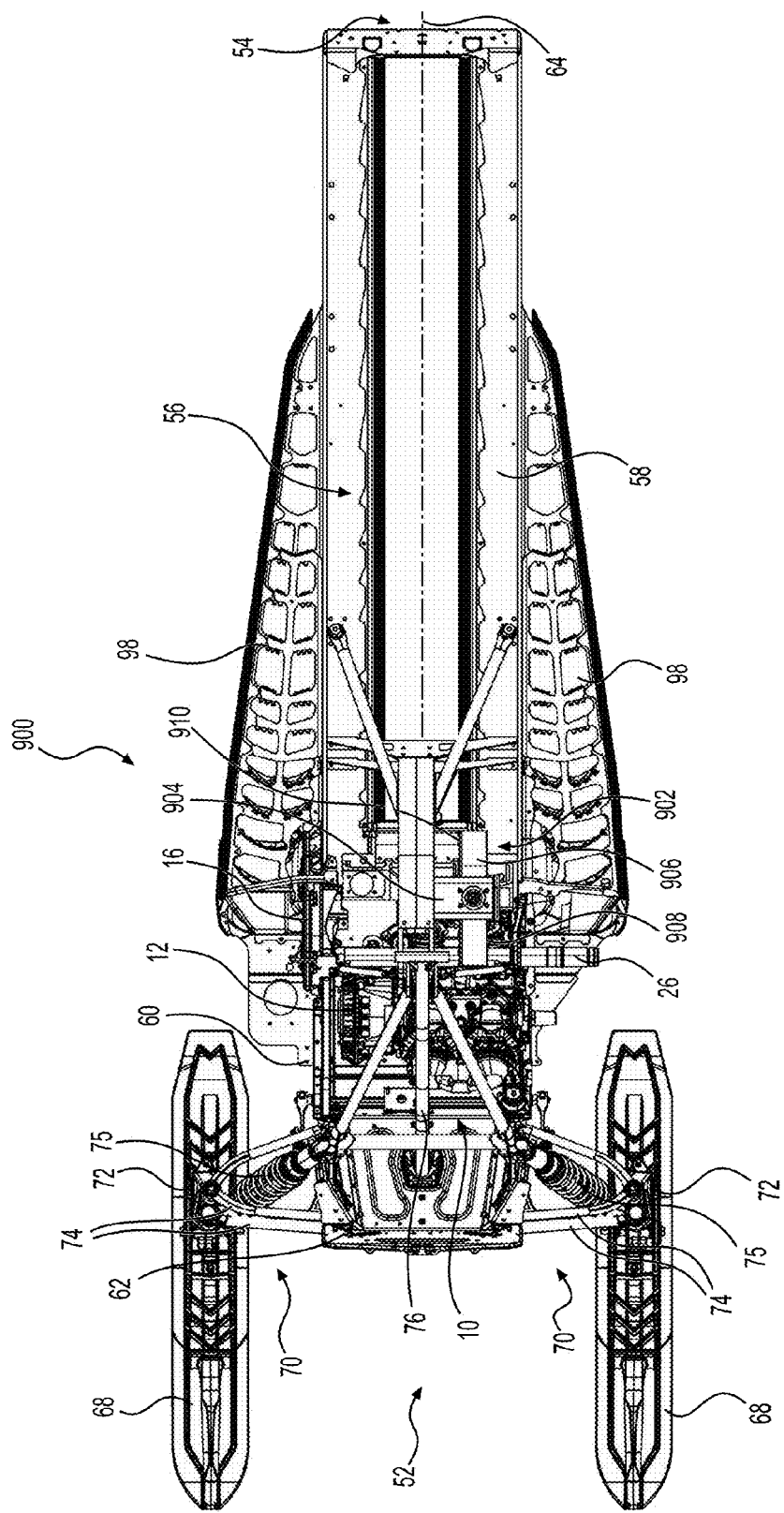
FIG. 16 is a top plan view of the elements of FIG. 14.
Figure 17:
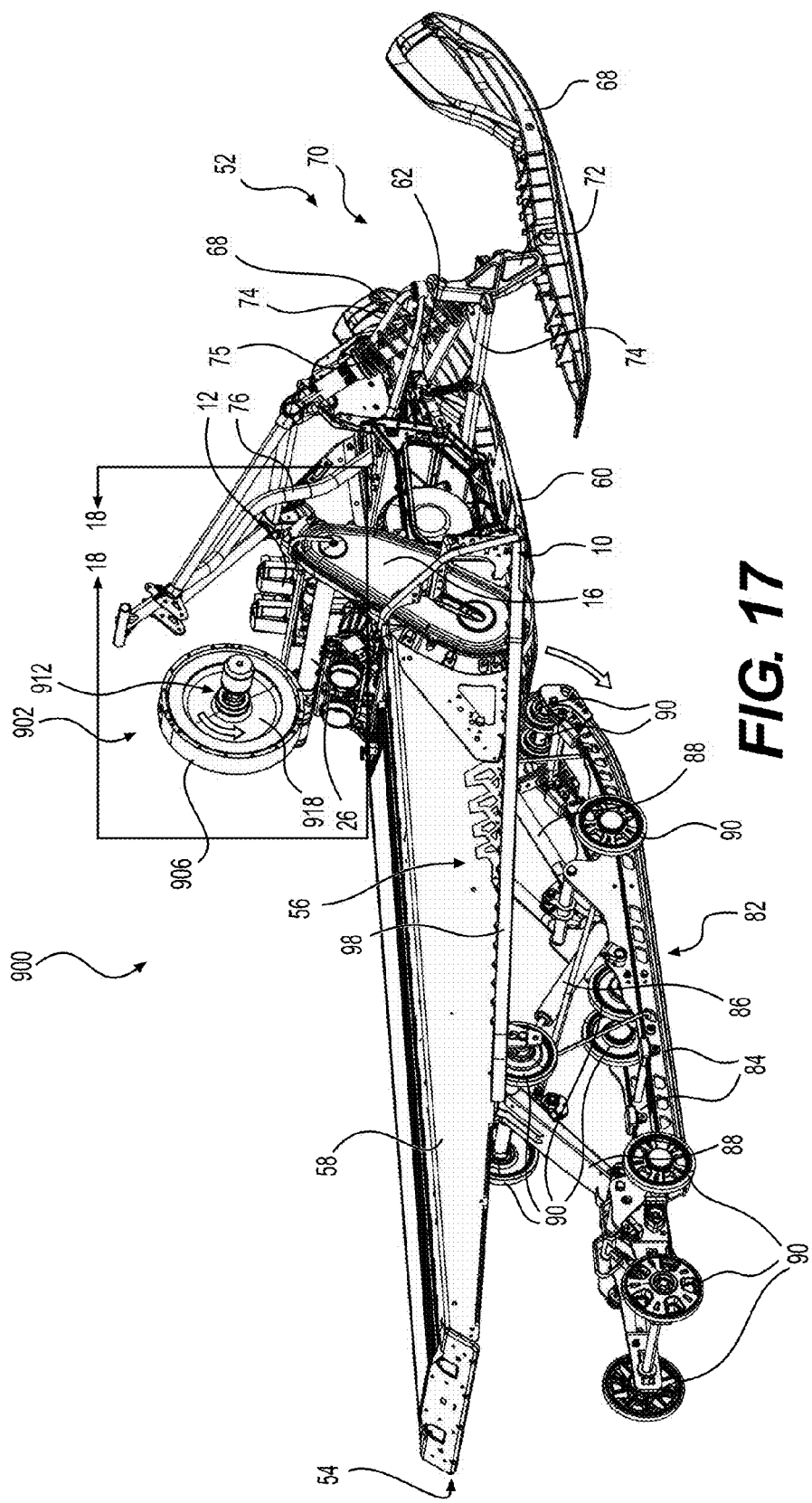
FIG. 17 is a perspective view taken from a rear, right side of the elements of FIG. 14.
Figure 18:
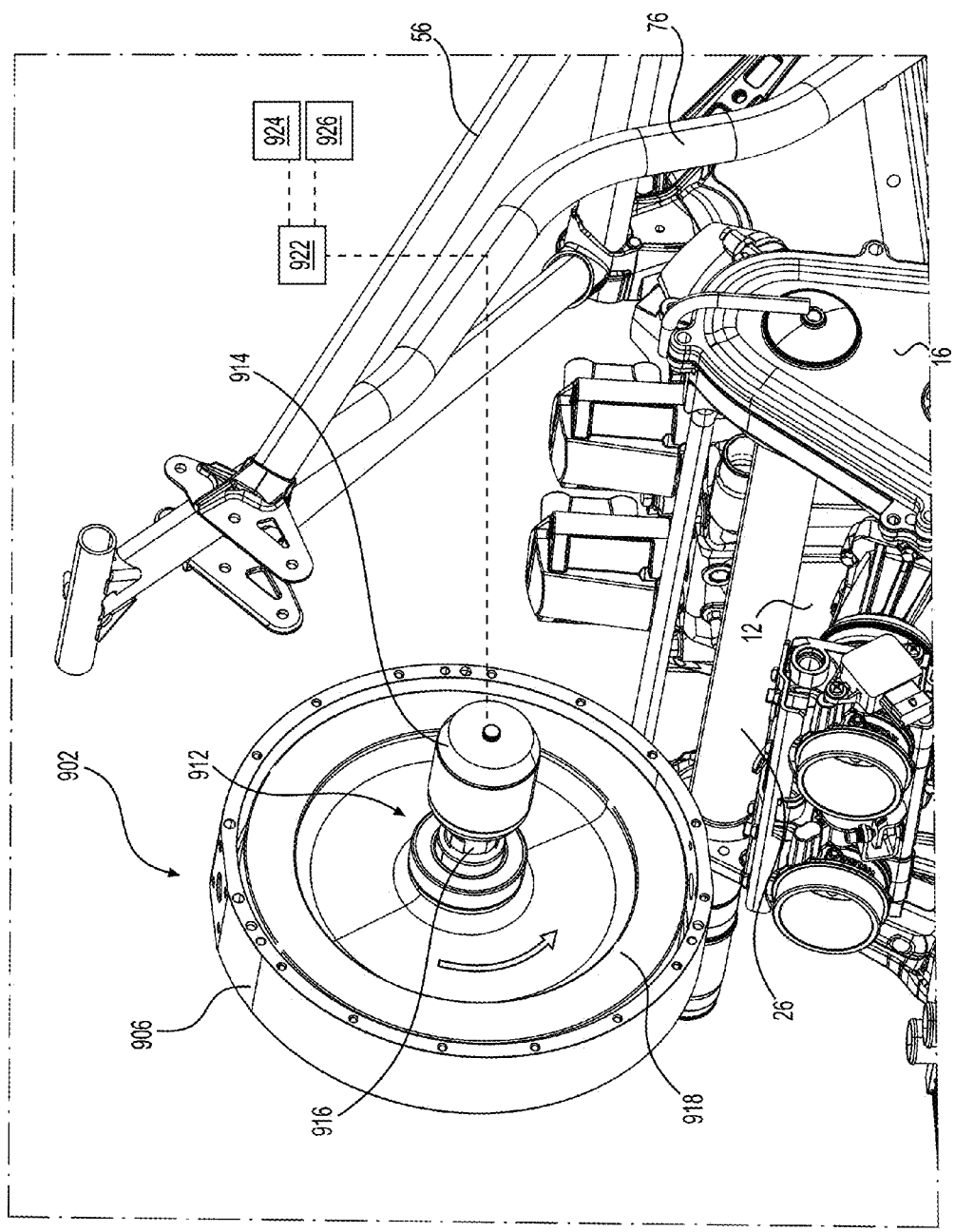
FIG. 18 is a close-up view of the area 18-18 of FIG. 17.

The rotor assembly 902 is fixedly connected to the frame 56 by a bracket 904. As can be seen, the rotor assembly 902 is disposed on a left side of the longitudinal centerline 64 of the snowmobile 900. It is contemplated that the rotor assembly 902 could be disposed on a right side of the longitudinal axis 64 or along the longitudinal axis 64. The rotor assembly 902 has a housing including a rim 906 connected to the bracket 904, a left cover 908 fastened to the left of the rim 906 and a right cover 910 fastened to the right of the rim 906. An electric motor assembly 912 (FIGS. 17, 18) is supported by the left and right covers 908, 910. The electric motor assembly 912 has a motor 914 disposed outside the housing to the right thereof and a shaft 916 inserted inside the housing that is driven by the motor 914. It is contemplated that the motor 914 could be disposed to the left of the housing. A rotor 918 is disposed inside the housing and is mounted onto the shaft 916 so as to be driven by the electric motor assembly 912. It is contemplated that the rotor 918 could alternatively be mounted onto a shaft driven via a belt and pulleys, a belt and drive sprocket, a chain and drive sprockets, gears or a combination thereof by a shaft of the powertrain 10, in a manner similar to the arrangement disclosed in U.S. patent application Ser. No. 14/093,311, filed Nov. 29, 2013, the entirety of which is incorporated herein by reference. As best seen in FIG. 15, a laterally extending axis of rotation 920 of the rotor 918 is upward and rearward of a center of the jackshaft 26 and upward and forward of a center of the drive axle 28, such that the rotor 918 is at least in part above the tunnel 58. The axis of rotation 920 is fixed and is perpendicular to the longitudinal centerline 64 of the snowmobile 900.

The electric motor assembly 912 is controlled by a controller 922 (schematically shown in FIG. 18) to cause the rotor 918 to rotate in a direction opposite to the direction of rotation of the drive track 80, thereby reducing the total angular momentum of the rotating parts as will be discussed below. It is contemplated that the controller 922 could be the engine control unit or a separate controller.

The motor 914 starts turning the rotor 918 in response to the actuation of a start actuator 924 (schematically shown in FIG. 18) in electronic communication with the controller 922. The start actuator 924 is a button, a switch or other device that can be actuated by the driver of the snowmobile 900. The start actuator 924 is disposed on or in proximity to the handlebar of the snowmobile 900. It is contemplated that the start actuator 924 could be the same actuator that is used to start the engine 12 (i.e. a start button or key mechanism/reader). It is also contemplated that the start actuator 924 could also be used to stop the motor 914, and therefore the rotor 918. It is also contemplated that the start actuator 924 could be omitted and that the motor 914 could start turning the rotor 918 in response to the controller 922 receiving a signal indicative that the crankshaft of the engine 12 is turning.

In some implementations, the switch or button 926 (schematically shown in FIG. 18) to be actuated by the driver of the snowmobile 900 is in electronic communication with the controller 922. The switch or button 926 is disposed on or in proximity to the handlebar of the snowmobile 900. As will be described below, once the motor 914 starts turning the rotor 918, it accelerates the rotor 918 to a predetermined speed and then maintains this speed of rotation of the rotor 918 until the controller 922 receives a signal to stop the motor 914. The switch or button 916 allows the driver 926 to select between two different predetermined speeds of rotation of the rotor 918. It is contemplated that the switch or button 926 could permit the selection between three or more different predetermined speeds of rotation of the rotor 918. It is contemplated that the switch or button 926 could be omitted and that the controller 922 could make the selection between predetermined speeds of rotation of the rotor 918 based on signals received by the controller 922 that are representative of the operating conditions of the snowmobile 900. It is also contemplated that the functions of the switch or button 926 and of the start actuator 924 could be combined in a single actuator, such as a three position switch (i.e. off, speed 1, speed 2). It is contemplated that the switch or button 926 could be omitted and that the rotor 918 could only be rotated at only one predetermined speed.

The control of the speed of rotation of the rotor 918 will now be described. The directions of rotation of the various components will be described with reference to FIG. 15. Once the start actuator 924 has been actuated, the controller 922 sends a signal to the motor 914 to start turning the rotor 918 in a clockwise direction. Once the engine start actuator, or the start actuator 924 should the start actuator 924 also be used as the engine start actuator, the engine 12 starts and turns the crankshaft in a counter-clockwise direction. The crankshaft drives the driving pulley 22, the driven pulley 24, the jackshaft 26, the drive axle 28 and the drive track and causes them to turn in a counter-clockwise direction. As the speeds of rotation of these components increase, their angular momentums increase. Since the rotor 918 turns in the opposite direction, the angular momentum of the rotor 918 counteracts the angular momentums of these components. The motor 914 increases the speed of rotation of the rotor 918 until it reaches a predetermined speed of rotation. Details regarding the predetermined speed of rotation of the rotor 918 will be discussed below. Once the predetermined speed of rotation of the rotor 918 has been reached, the motor 914 turns the rotor 918 such that the rotor 918 maintains this predetermined speed (i.e. the rotor 918 is kept at a constant speed of rotation). As such, the speed of the rotor 918 is independent of the engine speed. The motor 914 continues to rotate the rotor 918 at the predetermined speed of rotation until a predetermined condition is reach. Upon reaching the predetermined condition, the controller 922 sends a signal to the motor 914 to stop turning the rotor 918 such that the rotor 918 eventually stops rotating. In the present implementation, the predetermined condition is that the engine 12 stops. It is also contemplated that the motor 914 could stop turning the rotor 918 in response to the snowmobile 900 stopping (i.e. the speed of the snowmobile is 0 km/h) or in response to the engine 12 operating at an idle speed. It is contemplated that a brake could be provided to decelerate the rotor 918 faster when the motor 914 stops turning the rotor 918.

The mass, radius and the speed of rotation 918 all have an effect on the amount of angular momentum generated by the rotor 918. The mass should be selected to be as low as possible so as to not affect the performance of the snowmobile 900, such as its speed, acceleration and capacity to float on snow. The radius should be selected to be as large as possible within the available space so as to increase the moment of inertia of the rotor 918. In various implementations, the predetermined speed of rotation of the rotor 918 is selected such that under some conditions the magnitude of the sum of the angular momentums of the components of the snowmobile 900 turning in the counter-clockwise direction (with respect to FIG. 15), the drive track for example, is less than the magnitude of the sum of the angular momentums of the components of the snowmobile 900 turning in the clockwise direction, the rotor for example, and that under other conditions, it is greater. In other words, the sum of the angular momentums of the components of the snowmobile 900 turning about laterally extending axes is sometimes positive and sometimes negative.

In one implementation, the predetermined speed of rotation of the rotor 918 is selected such that for snowmobile speeds below a predetermined snowmobile speed, the magnitude of the sum of angular momentums of all components of the snowmobile 900 rotating in the counter-clockwise direction is less than the magnitude of the sum of angular momentums of all components of the snowmobile 900 rotating in the clockwise direction. For snowmobile speeds above the predetermined snowmobile speed, the magnitude of the sum of angular momentums of all components of the snowmobile 900 rotating in the counter-clockwise direction is greater than the magnitude of the sum of angular momentums of all components of the snowmobile 900 rotating in the clockwise direction. In one implementation, the predetermined speed of the snowmobile 900 is 40 km/h, but other speeds are contemplated.

In one implementation, the predetermined speed of rotation of the rotor 918 is selected such that the sum of the angular momentum generated by the rotor 918 at the predetermined speed of rotation and the angular momentum of the drive track when the snowmobile 900 is moving at a speed less than a maximum speed of the snowmobile 900 is zero. In one implementation, the speed of the snowmobile 900 that is less than the maximum speed of the snowmobile is 40 km/h.

In one implementation, the predetermined speed of rotation of the rotor 918 is selected such that for engine speeds below a predetermined engine speed, the magnitude of the sum of angular momentums of all components of the snowmobile 900 rotating counter-clock-wise is less than the magnitude of the sum of angular momentums of all components of the snowmobile 900 rotating in the clockwise direction. For at least some engine speeds above the predetermined engine speed, the magnitude of the sum of angular momentums of all components of the snowmobile 900 rotating in the counter-clockwise direction is greater than the magnitude of the sum of angular momentums of all components of the snowmobile 900 rotating in the clockwise direction. In one implementation, the predetermined engine speed is the driving pulley engagement speed (i.e. the speed of rotation that causes the driving pulley 22 to clamp the belt 14 to transmit torque to the driven pulley 24). The predetermined speed of rotation of the rotor 918 is greater than the predetermined engine speed and also greater than the speed of rotation of the drive track when the engine operates at the predetermined engine speed.

In one implementation, when the magnitude of the sum of angular momentums of all components of the snowmobile 900 rotating in the counter-clockwise direction is greater than the magnitude of the sum of angular momentums of all components of the snowmobile 900 rotating in the clockwise direction: the driven pulley speed is greater than the driving pulley speed; the driven pulley speed is greater than the speed of rotation of the track; and the speed of rotation of the rotor 918 is greater than the driven pulley speed.

It should be understood that a given mass, radius and predetermined speed of rotation of the rotor 918 may meet the requirements of more than one of the above implementations.

In an alternative implementation, is contemplated that the speed of rotation of the rotor 918 could be controlled so as to be proportional to the speed of rotation of the drive track 80. It is also contemplated that the speed of rotation of the rotor 918 could be controlled in relation to one or more other operating characteristics of the snowmobile 900 such as the engine speed for example.

Figure 19:
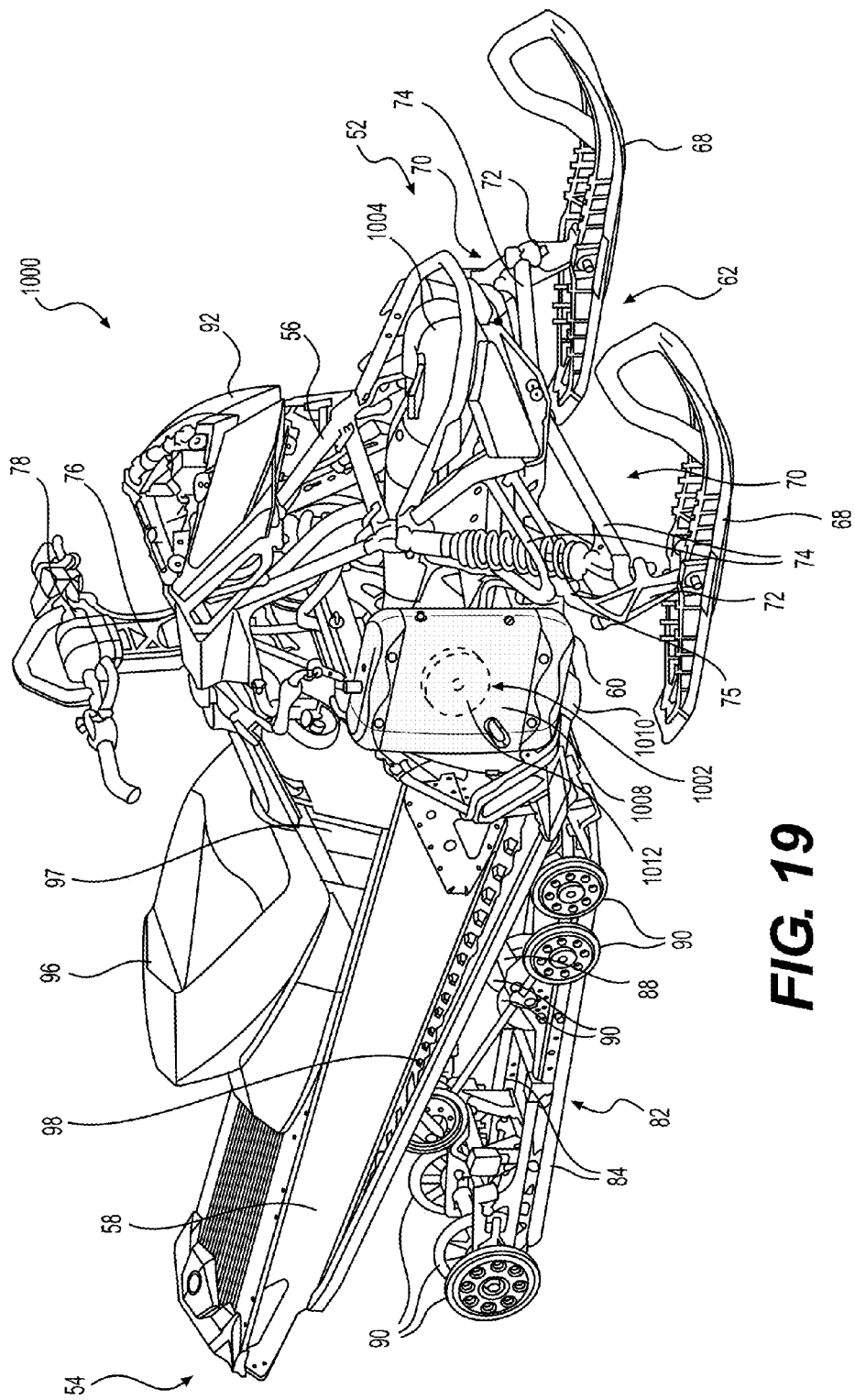
FIG. 19 is a perspective view taken from a front, right side of an alternative implementation of a snowmobile with some of the fairings and drive track removed.
Figure 20:
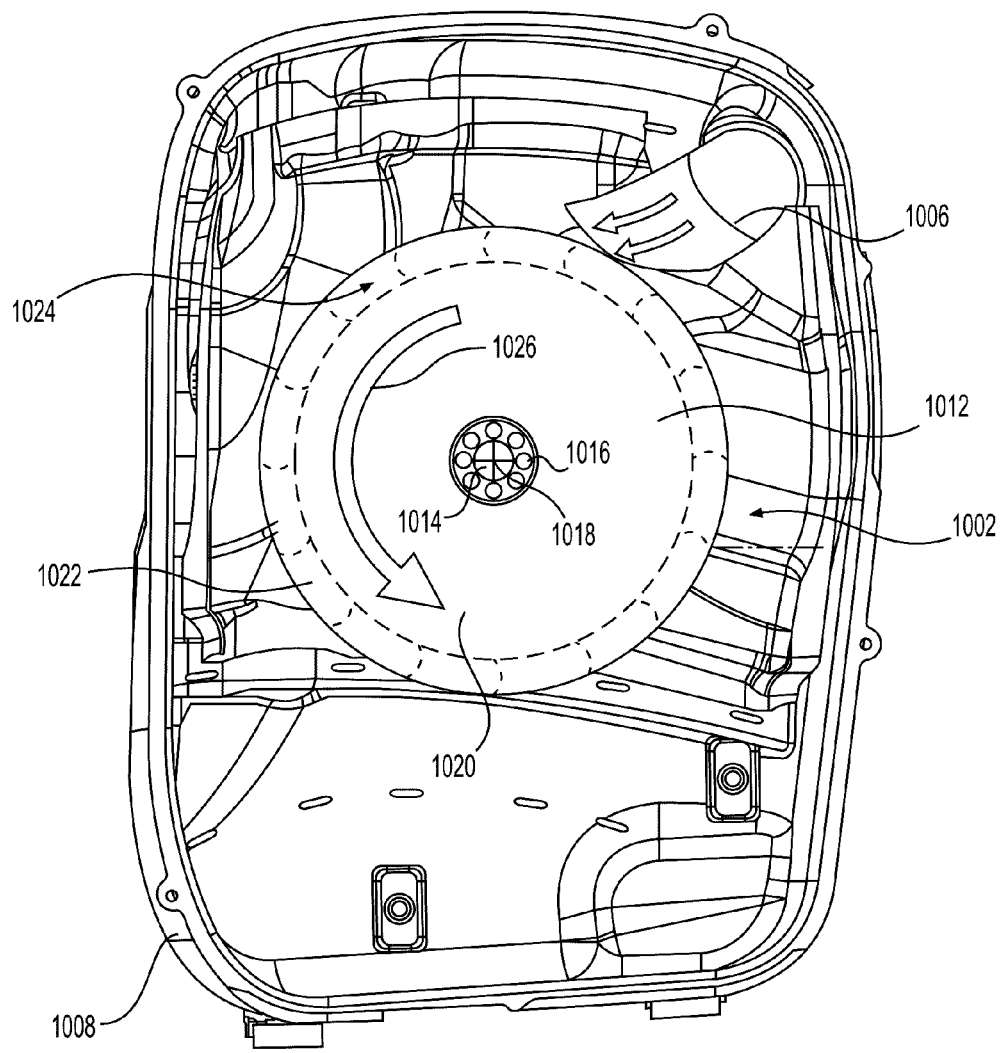
FIG. 20 is a right side elevation view of a muffler of the snowmobile of FIG. 19, with a right side of the muffler removed to show a rotor disposed inside the muffler.

Turning now to FIGS. 19 and 20, a snowmobile 1000 will be described. The snowmobile is similar to the snowmobile 900, but is provided with a rotor assembly 1002 instead of the rotor assembly 902. For simplicity, elements of the snowmobile 1000 which are similar to the elements of the snowmobiles 50 and 900 and of the powertrain 10 have been labeled with the same reference numerals and will not be described again herein. It is contemplated that the snowmobile 1000 could alternatively be provided with any one of the powertrains 100, 200, 300, 400, 500, 600, 700 and 800 described above.

As can be seen in FIG. 19, a tuned pipe 1004 is connected to the exhaust ports of the engine 12 (not visible in FIG. 19). The tuned pipe 1004 is generally U-shaped. From the exhaust ports, the tuned pipe 1004 extends forwardly, then turns toward the right and extends rearwardly. An inlet pipe 1006 (FIG. 20) is connected to the end of the tuned pipe 1004 and extends inside a muffler 1008. An exhaust pipe 1010 extending from the bottom of the muffler 1008 communicates the inside of the muffler 1008 with the atmosphere. It is contemplated that in implementations where the engine 12 is replaced with a four-stroke engine, the tuned pipe 1004 could be replaced by a plurality of exhaust pipes or an exhaust manifold and an exhaust pipe.

Turning now to FIG. 20, the rotor assembly 1002 is disposed inside the muffler 1008. In the present implementation, the rotor assembly 1002 has a rotor 1012 supported on an axle 1014. The axle 1014 is supported by the walls of the muffler 1008. A bearing 1016 disposed between the axle 1014 and the rotor 1012 permit the rotor 1012 to freely rotate about the axle 1014. The axis 1018 of the axle 1014 is the axis of rotation of the rotor 1012. The axis 1018 extends laterally, is fixed and is perpendicular to the longitudinal centerline of the snowmobile 1000.

The rotor 1012 has a central circular core 1020 disposed between two circular plates 1022. The plates 1022 have a larger diameter than the core 1020. A plurality of vanes 1024 extend from the core 1020 between the plates 1022. The inlet pipe 1006 is oriented such that exhaust gases exiting the inlet pipe 1006 push on the vanes 1024 so as to turn the rotor in the direction indicated by the arrow 1026. It is contemplated that the rotor 1012 could have a different construction that would allow it to be pushed by the exhaust gases so as to turn about the axis 1018. Since the rotor 1012 turns in the direction opposite to that of the drive track of the snowmobile 1000, the crankshaft of the engine 12, the driving pulley 22 and the driven pulley 24 when the snowmobile 1000 is moving forward, the rotor 1012 reduces the overall angular momentum of the snowmobile 1000.

It is contemplated that the rotor assembly 1002, or an alternative implementation thereof, could be disposed inside another component of the exhaust system of the snowmobile 1000. It is also contemplated that only a portion of the rotor 1012 could extend inside the muffler 1008 or another component of the exhaust system such that the exhaust gases flow onto this portion of the rotor 1012 to turn the rotor 1012. It is also contemplated that the rotor assembly 1012 could be disposed outside of the exhaust system completely and that a bypass pipe could direct a flow of exhaust gases from the exhaust system over the rotor 1012 to turn the rotor 1012 in the same direction as the rotor 1012 in FIG. 20 about a laterally extending axis.

In the implementation illustrated in FIG. 20, the exhaust gases flow generally in a longitudinal direction to push on the rotor 1012. It is contemplated that the rotor 1012 could be a propeller such that it would be caused to turn about the axis 1018 by exhaust gases flowing in generally lateral direction.

Modifications and improvements to the above-described implementations of the present technology may become apparent to those skilled in the art. For example, it is contemplated that the timing belts could be replaced by other types of flexible mechanical elements such as chains. It is also contemplated that the timing belts and drive sprockets could be replaced by belts and pulleys. It is also contemplated that other parts could rotate in a direction opposite to the drive track 80 such as a brake disc for example. The foregoing description is intended to be exemplary rather than limiting. The scope of the present technology is therefore intended to be limited solely by the scope of the appended claims.

What is claimed is:

1. A snowmobile comprising:
   a frame having a tunnel;
   a motor mounted to the frame, the motor having a motor shaft;
   at least one ski operatively connected to the frame;
   a continuously variable transmission comprising:
      a driving pulley operatively connected to the motor shaft;
      a driven pulley; and
      a drive belt looped around the driving pulley and the driven pulley;
   a drive track operatively connected to the driven pulley;
   a flexible mechanical element operatively connecting the drive track to the driven pulley, the drive track rotating in a first direction during operation of the snowmobile;
   a jackshaft connected to and driven by the driven pulley, the jackshaft being operatively connected to the flexible mechanical element to drive the flexible mechanical element; and
   at least one of the motor shaft, the driving pulley and the driven pulley rotating in a second direction opposite the first direction during operation of the snowmobile,
   the jackshaft rotating in the second direction during operation of the snowmobile.

2. The snowmobile of claim 1, wherein the motor is an internal combustion engine and the motor shaft is a crankshaft.

3. The snowmobile of claim 1, wherein the engine has at least one exhaust port defined on a rear side thereof.

4. The snowmobile of claim 1, wherein the motor shaft, the driving pulley and the driven pulley rotate in the second direction during operation of the snowmobile.

5. The snowmobile of claim 1, wherein the flexible mechanical element is one of a belt, and a chain.

6. The snowmobile of claim 1, further comprising:
   a drive axle operatively connecting the drive track to the flexible mechanical element, the drive axle rotating in the first direction during operation of the snowmobile;
   a first sprocket wheel operatively connected to the jackshaft; and
   a second sprocket wheel connected to the drive axle;
   wherein the flexible mechanical element is a timing belt engaging the first and second sprocket wheels; and
   wherein the first and second sprocket wheels rotate in the first direction during operation of the snowmobile.

7. The snowmobile of claim 6, wherein:
   the continuously variable transmission is disposed on one side of the motor; and
   the first and second sprocket wheels and the timing belt are disposed on another side of the motor.

8. The snowmobile of claim 6, further comprising:
   a first gear connected to the jackshaft; and
   a second gear connected to the first sprocket wheel, the first gear driving the second gear, the second gear driving the first sprocket wheel;
   wherein the first gear rotates in the second direction and the second gear rotates in the first direction during operation of the snowmobile.

9. A snowmobile comprising:
   a frame having a tunnel, the tunnel having a side wall;
   a motor mounted to the frame, the motor having a motor shaft;
   at least one ski operatively connected to the frame;
   a continuously variable transmission comprising:
      a driving pulley operatively connected to the motor shaft;
      a driven pulley; and
      a drive belt looped around the driving pulley and the driven pulley;
   a drive track operatively connected to the driven pulley;
   a flexible mechanical element operatively connecting the drive track to the driven pulley, the drive track rotating in a first direction during operation of the snowmobile; and
   at least one of the motor shaft, the driving pulley and the driven pulley rotating in a second direction opposite the first direction during operation of the snowmobile,
   the drive belt being disposed laterally between the motor and the side wall of the tunnel.

10. The snowmobile of claim 9, wherein the driven pulley extends at least in part over the tunnel.

11. A snowmobile comprising:
   a frame having a tunnel;
   a motor mounted to the frame, the motor having a motor shaft;
   at least one ski operatively connected to the frame;
   a drive track operatively connected to the motor shaft, the drive track rotating in a first direction during operation of the snowmobile;
   a rotor supported by the frame, the rotor rotating about a laterally extending axis in a second direction opposite the first direction during operation of the snowmobile, the laterally extending axis being perpendicular to a longitudinal centerline of the snowmobile;
   a continuously variable transmission operatively connecting the motor to the drive track, the continuously variable transmission comprising:
      a driving pulley operatively connected to the motor shaft;
      a driven pulley operatively connected to the drive track; and
      a drive belt looped around the driving pulley and the driven pulley; and
   a drive axle operatively connecting the drive track to the driven pulley,
   the laterally extending axis being disposed forward of an axis of rotation of the drive axle and rearward of an axis of rotation of the driven pulley.

12. The snowmobile of claim 11, further comprising an electric motor connected to the rotor for driving the rotor about the laterally extending axis in the second direction.

13. The snowmobile of claim 12, further comprising a start actuator for starting the motor; and
   wherein following actuation of the start actuator, the electric motor starts increasing a speed of rotation of the rotor up to a predetermined speed of rotation, and then maintains the speed of rotation of the rotor at the predetermined speed of rotation.

14. The snowmobile of claim 11, wherein the laterally extending axis is fixed.

15. A snowmobile comprising:
   a frame having a tunnel;
   a motor mounted to the frame, the motor having a motor shaft;
   at least one ski operatively connected to the frame;

a drive track operatively connected to the motor shaft, the drive track rotating in a first direction during operation of the snowmobile; and a rotor supported by the frame, the rotor rotating about a laterally extending axis in a second direction opposite the first direction during operation of the snowmobile, the laterally extending axis being perpendicular to a longitudinal centerline of the snowmobile, a mass, a radius and a speed of rotation of the rotor being selected such that:

for snowmobile speeds below a predetermined snowmobile speed, a magnitude of a sum of angular momentums of all components of the snowmobile rotating in the first direction is less than a magnitude of a sum of angular momentums of all components of the snowmobile rotating in the second direction; and for snowmobile speeds above the predetermined snowmobile speed, the magnitude of the sum of angular momentums of all components of the snowmobile rotating in the first direction is greater than the magnitude of the sum of angular momentums of all components of the snowmobile rotating in the second direction.

16. The snowmobile of claim 15, wherein the speed of rotation of the rotor is independent of a speed of the motor.

17. The snowmobile of claim 16, wherein the speed of rotation of the rotor is initially accelerated up to a predetermined speed of rotation and the speed of rotation of the rotor is then maintained at the predetermined speed of rotation.

18. The snowmobile of claim 15, further comprising a continuously variable transmission operatively connecting the motor to the drive track, the continuously variable transmission comprising:
a driving pulley operatively connected to the motor shaft;
a driven pulley operatively connected to the drive track; and
a drive belt looped around the driving pulley and the driven pulley.

19. The snowmobile of claim 18, further comprising a drive axle operatively connecting the drive track to the driven pulley; and wherein the laterally extending axis is disposed forward of an axis of rotation of the drive axle and rearward of an axis of rotation of the driven pulley.

20. The snowmobile of claim 15, further comprising an electric motor connected to the rotor for driving the rotor about the laterally extending axis in the second direction.

21. The snowmobile of claim 20, further comprising a start actuator for starting the motor; and wherein following actuation of the start actuator, the electric motor starts increasing the speed of rotation of the rotor up to a predetermined speed of rotation, and then maintains the speed of rotation of the rotor at the predetermined speed of rotation.

22. The snowmobile of claim 15, wherein the laterally extending axis is fixed.

23. The snowmobile of claim 15, wherein the speed of rotation of the rotor is constant.

24. The snowmobile of claim 15, wherein the predetermined snowmobile speed is less than a maximum speed of the snowmobile.

25. The snowmobile of claim 24, wherein the predetermined snowmobile speed is 40 km/h.

26. A snowmobile comprising:
a frame having a tunnel;
a motor mounted to the frame, the motor having a motor shaft;
at least one ski operatively connected to the frame;
a drive track operatively connected to the motor shaft, the drive track rotating in a first direction during operation of the snowmobile; and
a rotor supported by the frame, the rotor rotating about a laterally extending axis in a second direction opposite the first direction during operation of the snowmobile, the laterally extending axis being perpendicular to a longitudinal centerline of the snowmobile,
the motor being an internal combustion engine having at least one exhaust port, and
the rotor being driven about the laterally extending axis by exhaust gases.

27. The snowmobile of claim 26, further comprising a muffler fluidly communicating with the at least one exhaust port; and wherein the rotor is disposed inside the muffler and exhaust gases entering the muffler drive the rotor about the laterally extending axis.

28. A method for operating a snowmobile, the snowmobile comprising:
a frame having a tunnel;
a motor mounted to the frame, the motor having a motor shaft;
at least one ski operatively connected to the frame;
a drive track operatively connected to the motor shaft; and
a rotor supported by the frame, the rotor rotating about a laterally extending axis, the laterally extending axis being perpendicular to a longitudinal centerline of the snowmobile;

the method comprising:
operating the motor to turn the motor shaft in a first direction;
driving, with the motor shaft, the drive track in the first direction;
increasing a speed of rotation of the rotor up to a predetermined speed of rotation, the rotor turning in a second direction opposite the first direction; and
maintaining the speed of rotation of the rotor at the predetermined speed of rotation in the second direction once the predetermined speed of rotation has been reached,
the speed of rotation of the rotor being independent of a speed of the motor,
the predetermined speed of rotation being selected such that a sum of an angular momentum generated by the rotor at the predetermined speed of rotation and an angular momentum of the drive track when the snowmobile is moving at a speed less than a maximum speed of the snowmobile is zero.

29. The method of claim 28, wherein the speed of rotation of the rotor is maintained at the predetermined speed of rotation until a predetermined condition is reached, the predetermined condition being one of:
the snowmobile stops moving;
the motor stops; and
the speed of the motor is an idle speed.

30. The method of claim 29, further comprising, in response to the predetermined condition being reached, stopping the rotation of the rotor.

31. A method for operating a snowmobile, the snowmobile comprising:

a frame having a tunnel;
a motor mounted to the frame, the motor having a motor shaft;
at least one ski operatively connected to the frame;
a continuously variable transmission comprising:
    a driving pulley operatively connected to the motor shaft;
    a driven pulley; and
    a drive belt looped around the driving pulley and the driven pulley;
a drive track operatively connected to the driven pulley; and
a rotor supported by the frame, the rotor rotating about a laterally extending axis, the laterally extending axis being perpendicular to a longitudinal centerline of the snowmobile;
the method comprising:
    operating the motor to turn the motor shaft in a first direction;
    driving, with the motor shaft, the driving pulley, the driven pulley and the drive track in the first direction; and
    turning the rotor in a second direction opposite the first direction at a predetermined speed of rotation,
    the predetermined speed of rotation being selected such that:
        for motor speeds below a predetermined motor speed, a magnitude of a sum of angular momentums of all components of the snowmobile rotating in the first direction being less than a magnitude of a sum of angular momentums of all components of the snowmobile rotating in the second direction; and
        for at least some motor speeds above the predetermined motor speed, the magnitude of the sum of angular momentums of all components of the snowmobile rotating in the first direction being greater than the magnitude of the sum of angular momentums of all components of the snowmobile rotating in the second direction.

32. The method of claim 31, wherein the predetermined motor speed is a driving pulley engagement speed.

33. The method of claim 31, wherein the predetermined speed of rotation of the rotor is one of a first predetermined speed of rotation and a second predetermined speed of rotation;
the method further comprising selecting the one of the first and second predetermined speeds of rotation.

34. The method of claim 31, wherein the predetermined speed of rotation of the rotor is greater than the predetermined motor speed and a speed of rotation of the track when the motor is operating at the predetermined motor speed.

35. The method of claim 31, wherein when the magnitude of the sum of angular momentums of all components of the snowmobile rotating in the first direction is greater than the magnitude of the sum of angular momentums of all components of the snowmobile rotating in the second direction:
    a driven pulley speed is greater than a driving pulley speed and than a speed of rotation of the track; and
    a speed of rotation of the rotor is greater than the driven pulley speed.

\* \* \* \* \*